(12) United States Patent
Nakao et al.

(10) Patent No.: US 10,054,318 B2
(45) Date of Patent: Aug. 21, 2018

(54) HEAT ENERGY TRANSPORT SYSTEM, HEAT INTERCHANGE SYSTEM, AND HEAT ENERGY TRANSPORT METHOD

(71) Applicants: OSAKA CITY UNIVERSITY, Osaka-shi, Osaka (JP); Tsuyoshi Nagahiro, Osakasayama-shi, Osaka (JP)

(72) Inventors: Masaki Nakao, Osaka (JP); Masatoshi Nishioka, Osaka (JP); Craig Farnham, Osaka (JP); Tsuyoshi Nagahiro, Osaka (JP); Youichi Kobayashi, Osaka (JP)

(73) Assignees: OSAKA CITY UNIVERSITY, Osaka (JP); Tsuyoshi Nagahiro, Osaka (JP)

( * ) Notice: Subject to any disclaimer, the term of this patent is extended or adjusted under 35 U.S.C. 154(b) by 246 days.

(21) Appl. No.: 14/443,600

(22) PCT Filed: Nov. 18, 2013

(86) PCT No.: PCT/JP2013/081007
§ 371 (c)(1),
(2) Date: May 18, 2015

(87) PCT Pub. No.: WO2014/077381
PCT Pub. Date: May 22, 2014

(65) Prior Publication Data
US 2015/0345803 A1 Dec. 3, 2015

(30) Foreign Application Priority Data

Nov. 19, 2012 (JP) .................................. 2012-253544

(51) Int. Cl.
*F24F 3/00* (2006.01)
*F24D 10/00* (2006.01)
(Continued)

(52) U.S. Cl.
CPC .......... *F24D 10/00* (2013.01); *F24D 11/0235* (2013.01); *F24D 19/1039* (2013.01);
(Continued)

(58) Field of Classification Search
CPC .. F24D 10/00; F24D 11/0235; F24D 19/1039; F24D 19/0012; F24D 2200/24;
(Continued)

(56) References Cited

U.S. PATENT DOCUMENTS

2007/0005190 A1   1/2007  Feinleib et al.
2012/0168114 A1   7/2012  Uhrig
2012/0279681 A1*  11/2012 Vaughan ............... F24D 10/003
                                                    165/62

FOREIGN PATENT DOCUMENTS

JP      50-30342      3/1975
JP      59-32726 A    2/1984
(Continued)

OTHER PUBLICATIONS

Araki et al., "The proposal of a concept of "Best effort type heat accommodation network (BETHA Network)" (First Report)", The Society of Heating, Air-Conditioning Sanitary Engineers of Japan, Academic Lecture Collection, pp. 1695-1698 (2012).

*Primary Examiner* — Travis Ruby
(74) *Attorney, Agent, or Firm* — Birch, Stewart, Kolasch & Birch, LLP

(57) ABSTRACT

The heat medium transport paths are arranged between the first building and the second building and transport heat media that transport heat energy. A temperature distribution acquisition means acquires the temperature distribution of the heat media that have temperatures being different from each other in the heat medium transport paths and that are sequentially transported in a state of having a predetermined length in the transport direction in the heat medium transport paths. A control means receives a load request of an air
(Continued)

conditioner of the first building, and when a heat medium having the heat energy that satisfies the load request received reaches the first building, based on the temperature distribution acquired by the temperature distribution acquisition means, the control means causes the air conditioner of the first building to take out the heat energy from the heat medium reached.

25 Claims, 20 Drawing Sheets

(51) Int. Cl.
    *F24F 3/06*     (2006.01)
    *F24F 5/00*     (2006.01)
    *F24D 11/02*     (2006.01)
    *F24D 19/10*     (2006.01)

(52) U.S. Cl.
    CPC .............. *F24F 3/06* (2013.01); *F24F 5/0003* (2013.01); *F24D 2200/24* (2013.01); *Y02B 10/70* (2013.01); *Y02B 30/125* (2018.05); *Y02B 30/52* (2013.01); *Y02P 80/14* (2015.11)

(58) Field of Classification Search
    CPC ..... F24D 2220/042; F24F 3/06; F24F 5/0003; Y02P 80/14; Y02P 80/152; Y02B 10/70; Y02B 30/126; Y02B 30/52
    See application file for complete search history.

(56) References Cited

FOREIGN PATENT DOCUMENTS

| | | |
|---|---|---|
| JP | 2001-153381 A | 6/2001 |
| JP | 2012-42162 A | 3/2012 |

* cited by examiner

HEAT ENERGY TRANSPORT SYSTEM, HEAT INTERCHANGE SYSTEM, AND HEAT ENERGY TRANSPORT METHOD

TECHNICAL FIELD

The present invention relates to a heat energy transport system, a heat interchange system, and a heat energy transport method, which can effectively utilize heat energy.

BACKGROUND ART

Conventionally, regional heat supply systems have been practically applied, wherein heat medium such as cooled water, warm water, and vapor, which are intensively produced in one or several heat supply facilities (regional heating and cooling plants), are supplied to a plurality of buildings by use of regional pipes. For example, when a heat supply facility A supplies the heat medium to a region A, the heat supply systems of this type is designed and operated in such a manner as to maintain a difference between the temperature of the heat medium supplied to the buildings in the region A and the temperature of the heat medium utilized for air-conditioning in the buildings and the like and returned to the heat supply facility A in a predetermined range (when the difference in temperatures is out of the predetermined range, the heat supply facility A cannot supply the heat medium having a predetermined temperature to the buildings in the region A). Accordingly, this makes it possible to stably supply heat energy required for each building from the heat supply facility A to each building in the region A.

However, with this constitution, even when the heat supply facility A, which supplies the heat medium to the region A, and a heat supply facility B, which supplies the heat medium to a region B are adjacent to each other, the heat supply in the regions A and B cannot be efficiently carried out by integrally operating the heat supply facility A and the heat supply facility B. In general, the heat demands in the region A and the region B are not equal, and as a result, this is attributed to a difference between the temperature of the heat medium supplied from the heat supply facility A and the temperature of the heat medium supplied from the heat supply facility B. When the temperatures of the heat media supplied from each heat supply facility are different, and the regional pipes of respective regional heat supply systems are simply connected to each other, the heat media having different temperatures are mixed, which causes fluctuation in the temperatures of the heat media at the connection point. Then, it becomes difficult to maintain a difference between the temperature of the heat medium supplied from the heat supply facility and the temperature of the heat medium returned to the heat supply facility in a predetermined range, and as a result, the heat energy required for the buildings in each region cannot be supplied.

In order to avoid the problem of mixture of the heat media, for example, Patent Literature 1 discloses constitution in which the regional heat supply system, which supplies the heat medium to the region A, and the regional heat supply system, which supplies the heat medium to the region B, are connected via a heat storage tank. With this constitution, for example, when the temperature of the heat medium supplied to the region B is higher than the temperature of the heat medium supplied to the region A, the heat medium flowing through the regional pipes in the region A are introduced to the heat storage tank. In the heat storage tank, the temperature of the heat medium is raised by use of the heat energy of the heat medium flowing through a return pipe, and the heat medium whose temperature has been raised, is supplied to the regional pipes in the region B. Also, in order to avoid the problem of the mixture of the heat media, Patent Literature 2 discloses constitution in which a plurality of return pipes are provided, thereby changing the return pipes that are used in accordance with the temperature of the heat medium.

On the other hand, Non-Patent Literature 1 proposes "Best Effort Type Heat Accommodation Network" in which a heat source is provided in each building or each house, and the heat is interchanged between houses and the buildings in the neighborhood, not the type of supplying the heat medium from a specific heat supply facility to the buildings in a region as described above.

CITATION LIST

Patent Literature

PTL 1: Japanese Unexamined Patent Application Publication No. 2001-153381
PTL 2: Japanese Unexamined Patent Application Publication No. 2012-042162

Non-Patent Literature

Araki Kazumichi, Kashiwagi Takao, et al, "The proposal of a concept of "Best effort type heat accommodation network (BETHA Network)" (First Report).", The Society of Heating Air-Conditioning and Sanitary Engineers of Japan, Academic Lecture Collection, pp. 1695-1698 (2012).

SUMMARY OF INVENTION

Technical Problems

However, in the conventional technologies disclosed by Patent Literature 1, the heat medium is transported from one or several heat supply facilities through the regional pipes to the buildings, and the heat medium after being utilized in the buildings is returned to the heat supply facilities through the return pipes. That is, a heat source facility is not installed in each building, and heat energy is transmitted from the heat supply facilities to each building in one-way traffic. Accordingly, even when there exist buildings and the like, which include heat sources in the region to which the heat energy is supplied by means of a conventional regional heat supply system, the heat energy generated in the buildings cannot be effectively utilized by use of the conventional regional heat supply system. Also, with the above-mentioned constitution, the heat medium utilized in each building are introduced to the return pipes and returned to the heat supply facilities, so that the heat medium cannot be reused at all in the region. Regarding this point, the same is applied to the technology disclosed by Patent Literature 2.

On the other hand, regarding the constitution disclosed by Non-Patent Literature 1, each building includes the heat source facility, and when the heat energy cannot be supplied by its own heat source facility, the building makes use of the heat energy generated by the heat source facility of a building in the neighborhood. Accordingly, it seems that it is possible to effectively utilize the heat energy generated by the building including the heat source facility and the like in the region. However, Non-Patent Literature 1 discloses conception only, but fails to disclose the specific constitution to realize its conception, and it is not clarified on what constitution the heat energy generated by the heat source facility of the building in the neighborhood can be utilized. Also, it is not clear that constitution is made in such a manner that the heat energy supplied to the building in the neighborhood is recyclable.

That is, in the technologies disclosed by the above-mentioned prior art, the heat energy generated by the building including the heat source facility cannot be effectively utilized in the region. Also, the heat medium is supplied to a certain building, and after the heat energy included in the heat medium has been used in the building, the heat energy included in the heat medium cannot be utilized in other building.

Also, as descried above, when the heat medium in which the heat energy remains are returned to the heat source facility through the return pipes, a difference in temperatures of the heat media before and after the application of the heat energy to the heat medium in the heat source facility is decreased, and the operational efficiency of the heat source facility is reduced. For example, a case is assumed where the heat source facility supplies the heat medium of 5 degrees C. for the purpose of cooling, and the heat source facility has the capability of converting the heat medium of 20 degrees C., which have been returned through the return pipes, to the heat medium of 5 degrees C. In this situation, when the heat medium of 10 degrees C. are returned to the heat source facility through the return pipes, the heat source facility generates the heat medium of 5 degrees C. from the heat medium of 10 degrees C. In this case, the heat source facility is operated with its capability limited, and this operational state often leads to a low efficiency.

Furthermore, when the conventional regional heat supply system, in which the heat energy is transmitted from the heat supply facilities to each building in one-way traffic as described above, is newly installed in the existing region where the buildings have already been completed, the heat source facility that has been already installed in the existing building is replaced and renewed to the regional heat supply system. In this case, the existing heat source facility becomes unnecessary, so that when the heat source facility is still sufficiently usable, the demand for substituting the heat source facility for the regional heat supply system is low. Also, it is conceivable that the buildings whose renewal for the heat source facility is due are sequentially connected to the regional heat supply system, but it is not easy for the existing heat supply system to arbitrarily connect with the new buildings because heat supply facilities in accordance with the demands in the region supplied are provided in the conventional regional heat supply system.

On the other hand, in the existing region where the heat sources that are independent from each other are included in the buildings, it is necessary to generate the heat energy not to be short of the heat energy in the respective buildings. Accordingly, under the present circumstances, each heat source is operated at a low efficiency, or excessive heat energy is generated in order to perform a high efficient operation, which leads to a low energy efficiency in the region as a whole.

The present invention has been achieved in view of the problems of the conventional technologies, and it is an object of the present invention to provide a heat energy transport system, a heat interchange system, and a heat energy transport method, which can exceedingly effectively utilize the hear energy generated in a region and can be easily applied to the existing buildings.

Solution to Problem

The present invention adopts technical means below in order to achieve the above-mentioned object. That is, the heat energy transport system according to the present invention includes a heat medium transport path, a heat source, a heat demand end, a temperature distribution acquisition means, and a control means. The heat medium transport path transports heat media that transport heat energy. The heat source is connected to the heat medium transport path and supplies the heat energy to the heat medium transport path. The heat demand end is connected to the heat medium transport path and take outs the heat energy from the heat medium transport path. The temperature distribution acquisition means acquires temperature distribution of the heat media that have temperatures being different from each other in the heat medium transport path and that are sequentially transported in a state of having a predetermined length in the transport direction in the heat medium transport path. The control means receives a load request of the heat demand end and, when the heat medium having the heat energy that satisfies the load request received reaches the heat demand end that makes the load request based on the temperature distribution acquired by the temperature distribution acquisition means, the control means causes the heat demand end to take out the heat energy from the heat medium reached.

In the heat energy transport system, a mass of heat media having different temperatures are transported in the heat medium transport path. That is, the heat energy can be transported in a state where the heat media to which the different heat energy is applied coexist in the heat medium transport path. Accordingly, for example, the heat energy that becomes redundant in the building connected to the heat interchange system or the heat energy that remains after being used in the building can be arbitrarily transported to other buildings. Consequently, the small amount of heat energy, which has been conventionally discarded, and waste heat can be effectively utilized. As a result, a primary side energy of the heat source can be exceedingly reduced. Also, heat energy suppliers and heat energy users are easily identified, so that charge can be relatively easily carried out.

Regarding the above-mentioned constitution, the constitution can be adopted such that the control means causes the heat source to supply the heat medium having the heat energy that satisfies the load request received. With this constitution, the constitution can be adopted such that, when a plurality of heat sources are connected to the heat medium transport path, the control means specifies the heat source, by which the heat energy is supplied, based on the operational state of each heat source.

Also, with the above-mentioned constitution, the constitution can be adopted such that the heat medium transport path is annularly formed, and the heat medium is not taken out from the heat medium transport path with regard to the heat source and the heat demand end, and only the heat energy is given to and received from the heat media. Also, the constitution can be adopted such that the heat medium transport path includes an annular first transport path and an annular second transport path, and the heat source and the heat demand end include a buffer tank that accumulates the heat medium taken out from the first transport path or the second transport path. In this case, the heat energy is given to and received from the heat medium accumulated in each of the buffer tanks. Furthermore, the constitution can be adopted such that the heat medium transport path includes the annular first transport path and the annular second transport path, and the heat source and the heat demand end include a buffer tank that accumulates intermediate heat medium through which the heat energy is given to and received from the heat media transported through the heat medium transport path. In this case, the heat energy is given and received between the heat medium used in the heat source and the heat demand end and the intermediate heat medium accumulated in each of the buffer tanks.

On the other hand, from another viewpoint, the present invention can provide a heat interchange system in which the heat energy is interchanged in the region. That is, the heat interchange system according to the present invention includes a first building that includes at least one air conditioner, a second building that includes at least one heat source, a heat medium transport path, a temperature distribution acquisition means, a control means. The heat medium transport path is arranged between the first building and the second building and transports the heat media that transport heat energy. The temperature distribution acquisition means acquires the temperature distribution of the heat media that have temperatures being different from each other in the heat medium transport path and that are sequentially transported in a state of having a predetermined length in the transport direction in the heat medium transport path. The control means receives a load request of the air conditioner of the first building, and when the heat medium having the heat energy that satisfies the load request received reaches the first building, based on the temperature distribution acquired by the temperature distribution acquisition means, the control means causes the first building to take out the heat energy from the heat medium reached and causes the air conditioner to use the heat energy taken out.

In the heat interchange system, a mass of heat media having different temperatures is transported in the heat medium transport path. That is, the heat energy can be transported in a state where the heat media to which the different heat energy is applied coexist in the heat medium transport path. Accordingly, for example, the heat energy that becomes redundant in the building connected to the heat interchange system or the heat energy that remains after being used in the building can be arbitrarily transported to other buildings. Consequently, the small amount of heat energy, which has been conventionally discarded, and waste heat can be effectively utilized. As a result, the primary side energy of the heat source can be exceedingly reduced. Also, heat energy suppliers and heat energy users are easily identified, so that charge can be relatively easily carried out.

With the above-mentioned constitution, the constitution can be adopted such that the control means causes the heat source included in the second building to supply the heat medium having the heat energy that satisfies the load request received. With this constitution, the constitution can be adopted such that, when a plurality of buildings, each of which includes the heat source, are connected to the heat medium transport path, and the control means specifies the second building, from among the plurality of buildings, based on an operational state of the heat source of each building.

Also, with the above-mentioned constitution, the constitution can be adopted such that the heat medium transport path includes an annular first transport path and an annular second transport path, and the first building and the second building include a buffer tank that accumulates the heat medium taken out from the first transport path or the second transport path. In this case, the heat energy is given to and received from the heat medium accumulated in each of the buffer tanks.

Regarding the heat interchange system, the constitution can be adopted such that a plurality of buildings, each of which includes the buffer tank that accumulates the heat medium taken out from the first transport path or the second transport path, are connected to the heat medium transport path. In this case, when a heat medium having the heat energy that satisfies the load request received is accumulated in the buffer tank included in any of the plurality of buildings, and use of the heat medium in the buffer tank is not decided, the control means specifies the building and the buffer tank as the above-mentioned second building and the heat source. With the above-mentioned constitution, the buffer tank can function as a soaking tank that generates a heat medium having a single temperature, by use of the heat media having different temperatures or remaining heat energy discharged from the buildings.

Also, with the above-mentioned constitution, the constitution can be adopted such that when the heat source of the second building infuses the heat medium, to which the heat energy is applied, into the first transport path or the second transport path, the heat medium of the same amount as the amount of heat medium infused from the transport path, which is a target for the infusion, is extracted concurrently with the infusion, on the downstream side of a position of the infusion. Also, the constitution can be adopted such that the heat medium, to which the heat energy is applied, is extracted in the buffer tank of the first building from the first transport path or the second transport path, the heat medium of the same amount as the amount of heat medium extracted is infused, concurrently with the extraction, into the transport path that is a target for the infusion, on the upstream side of a position of the extraction.

Furthermore, the connection portion between the first transport path and the second transport path, and the buffer tank can adopt the following constitution. That is, the connection portion includes an open-and-close valve interposed in the first transport path, and an open-and-close valve interposed in the second transport path. Also, the connection portion includes a first heat medium introduction path whose one end is connected to one side of the open-and-close valve of the first transport path, and a second heat medium introduction path whose one end is connected to one side of the open-and-close valve of the second transport path. The other ends of the first heat medium introduction path and the second heat medium introduction path are connected to one end of a common introduction path, and the other end of the common introduction path is connected to the buffer tank. Furthermore, the connection portion includes a first heat medium lead-out path whose one end is connected to the other side of the open-and-close valve of the first transport path and a second heat medium lead-out path whose one end is be connected to the other side of the open-and-close valve of the second transport path. The other ends of the first heat medium lead-out path and the second heat medium lead-out path are connected to one end of a common lead-out path, and the other end of the common lead-out path is connected to the buffer tank. The open-and-close valves are respectively interposed in the first heat medium introduction path, the second heat medium introduction path, the common introduction path, the first heat medium lead-out path, and the second heat medium lead-out path. Also, a pump that delivers the heat medium to the buffer tank side is provided on the upstream side of the open-and-close valve interposed in the common introduction path, and a pump delivers the heat medium from the buffer tank to the one end side of the common lead-out path is provided in the common lead-out path. Furthermore, the common introduction path disposed between the pump and the open-and-close valve of the common introduction path, and the common lead-out path on the downstream side of the pump of the common lead-out path are connected by a bypass flow path, and an open-and-close valve is interposed in the bypass flow path.

In contrast, regarding the heat interchange system, the constitution can be adopted such that the heat medium transport path includes an annular first transport path and an annular second transport path, and the first building and the second building include a buffer tank that accumulates intermediate heat medium through which the heat energy is given to and received from the heat media transported through the heat medium transport path. In this case, the heat energy is given and received between the heat medium used in the first building and the second building and the intermediate heat medium accumulated in each of the buffer tanks.

Regarding the heat interchange system, the constitution can be adopted such that the heat medium transport path is connected to a plurality of buildings, each of which includes the buffer tank that accumulates intermediate heat medium through which the heat energy is given to and received from the heat media transported through the heat medium transport path. In this case, when an intermediate heat medium having the heat energy that satisfies the load request received is accumulated in the buffer tank included in any of the plurality of buildings, and use of the intermediate heat medium in the buffer tank is not decided, the control means specifies the building and the buffer tank as the second building and the heat source. Also, a plurality of buffer tanks mentioned above is arranged in each building.

Also, with the above-mentioned constitution, the first building can include a common heat exchanger that carries out heat exchange between the heat media transported through the heat medium transport path and the intermediate heat medium, heat exchange between the heat media transported through the heat medium transport path and heat medium for the air conditioner, and heat exchange between the intermediate heat medium and the heat medium for the air conditioner. Similarly, the second building can include a common heat exchanger that carries out heat exchange between the heat media transported through the heat medium transport path and the intermediate heat medium, heat exchange between the heat media transported through the heat medium transport path and heat medium for the heat source, and heat exchange between the intermediate heat medium and the heat medium for the heat source.

Furthermore, from another viewpoint, the present invention can provide a heat energy transport method. That is, regarding the heat energy transport method according to the present invention, first, a load request can be received. Subsequently, the temperature distribution of heat media is acquired that have temperatures being different from each other in a heat medium transport path, in which the heat media that transport heat energy are transported, and that are sequentially transported in a state of having a predetermined length in a transport direction in the heat medium transport path. Subsequently, a mass of heat medium having the heat energy that satisfies the load request received is specified based on the temperature distribution. The mass of heat medium specified is transported to a request source of the load request through the heat medium transport path. Then, when the mass of heat medium specified reaches the request source of the load request, the heat energy is taken out from the heat medium reached.

In the heat energy transport method, the mass of heat media having different temperatures is transported in the heat medium transport path. That is, the heat energy can be transported in a state where the heat media to which the different heat energy is applied coexist in the heat medium transport path. Accordingly, for example, the heat energy that becomes redundant in the building connected to the heat energy transport system or the heat energy that remains after being used in the building can be arbitrarily transported. Consequently, the small amount of heat energy, which has been conventionally discarded, and waste heat can be effectively utilized. As a result, the primary side energy of the heat source can be exceedingly reduced. Also, heat energy suppliers and heat energy users are easily identified, so that charge can be relatively easily carried out.

In the heat energy transport method, the constitution can be adopted such that, regarding the step for specifying the mass of heat medium having the heat energy that satisfies the load request received, based on the temperature distribution, when the mass of heat medium having the heat energy that satisfies the load request received cannot be specified, the mass of heat medium having the heat energy that satisfies the load request is generated in the heat medium transport path by mean of a heat source connected to the heat medium transport path. Also, the constitution can be adopted such that, regarding the step for specifying the mass of heat medium having the heat energy that satisfies the load request received, based on the temperature distribution, when the mass of heat medium having the heat energy that satisfies the load request received cannot be specified, the mass of heat medium having the heat energy that satisfies the load request is generated in the heat medium transport path by means of remaining heat energy whose part is consumed in other building connected to the heat medium transport path.

Advantageous Effects of Invention

According to one aspect of the present invention, the heat energy generated in the buildings that include the heat source can be effectively utilized in the region. Also, the heat medium is supplied to a certain building, and after the heat energy included in the heat medium has been used in the building, the heat energy included in the heat medium can be utilized in other buildings. As a result, the heat energy can be effectively utilized, and the efficiency of the heat source can be improved. Furthermore, heat energy suppliers and heat energy users are easily identified, so that charge can be relatively easily carried out.

DESCRIPTION OF EMBODIMENTS

Figure 1:
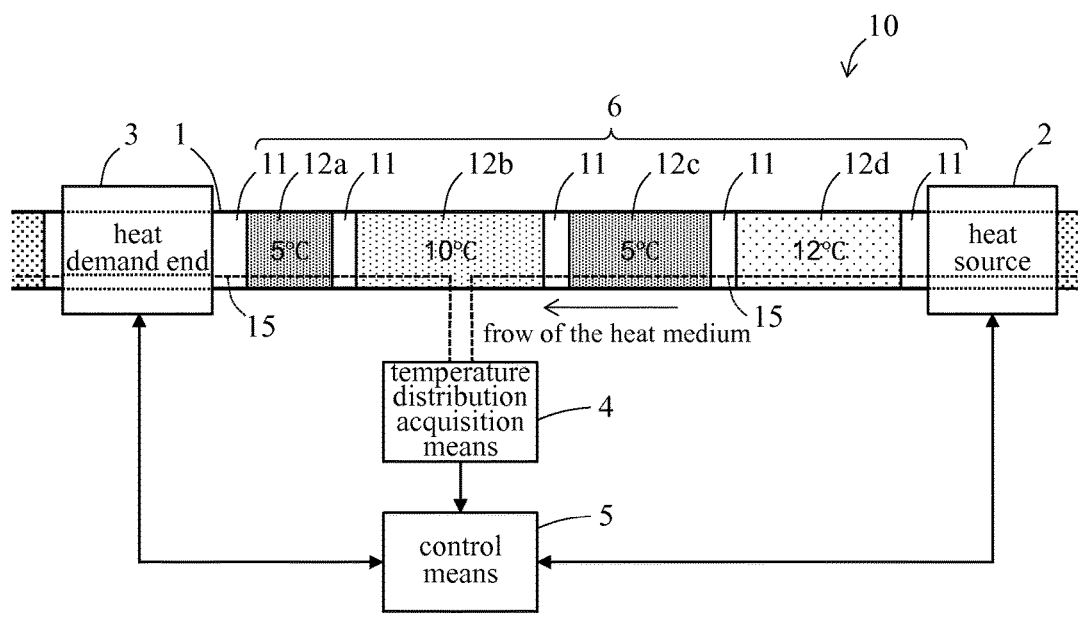
FIG. 1 is a schematic view to describe the principle of the heat energy transport of the present invention.

Hereinafter, embodiments of the present invention will be described in detail referring to the drawings. First, the principle of a heat energy transport of the present invention will be described. FIG. 1 is a schematic view to describe the principle of the heat energy transport of the present invention.

As illustrated in FIG. 1, a heat energy transport system 10 of the present invention includes a heat medium transport path 1, a heat source 2, a heat demand end (heat load) 3, a temperature distribution acquisition means 4, and a control means 5.

The heat medium transport path 1 transports the heat media 6 that transport heat energy. The heat source 2 and the heat demand end 3 are connected to the heat medium transport path 1. Herein, for the sake of description, one heat source 2 and one heat demand end 3 are illustrated, but as described later, a plurality of heat sources 2 and a plurality of heat demand ends 3 are connected to the heat medium transport path 1. Although not particularly limited, the heat source 2 and the heat demand end 3 are buildings and the like. That is, the buildings and the like, which can supply heat energy, can be applied as the heat source 2, and the buildings and the like, which can consume the heat energy, can be applied as the heat demand end 3. Also, in FIG. 1, although a diagram is illustrated such that the heat medium transport path 1 penetrates the heat source 2 and the heat demand end 3, this is aimed at schematically illustrating that the heat source 2 can supply the heat energy to the heat media 6 in the heat medium transport path 1, and that the heat demand end 3 can acquire the heat energy from the heat media 6 in the heat medium transport path 1, which does not represent the specific constitution of the delivery and acceptance of the heat energy. The delivery and acceptance of the heat energy, for example, can be carried out via a heat exchanger that directly or indirectly carries out heat exchange with the heat media 6 in the heat medium transport path 1. Herein, it is assumed that the heat media 6 flow from the heat source 2 to the heat demand end 3 in the heat medium transport path 1.

The heat source 2 supplies the heat energy to the heat medium transport path 1, and the heat demand end 3 takes out the heat energy from the heat medium transport path 1. In the heat medium transport path 1, the heat media 6 are distributed in a state of having temperatures that are different from each other. FIG. 1 illustrates a state where a heat medium 12a of 5 degrees C., a heat medium 12b of 10 degrees C., a heat medium 12c of 5 degrees C., and a heat medium 12d of 12 degrees C. are distributed from the downstream side. A series of heat media 6 (12a to 12d each) having the same temperature has a certain length along the heat medium transport direction of the heat medium transport path 1. Hereinafter, a mass of heat media 6 having the same temperature and a substantial length along the heat medium transport direction of the heat medium transport path 1 is appropriately referred to as "heat packet".

The temperature distribution acquisition means 4 that acquires the temperature distribution of the heat media 6 is installed in the heat medium transport path 1. For example, the temperature distribution acquisition means 4 can be configured to include temperature sensors that are installed at regular intervals in the heat medium transport path 1 and a device that monitors the output of each temperature sensor. However, in the present embodiment, constitution is adopted wherein the temperature distribution is acquired by means of an optical fiber 15 laid in the heat medium transport path 1. The temperature distribution acquisition means 4 having the above-mentioned constitution inputs optical pulses into one end of the optical fiber 15 and measures a Raman scattering ray (Stokes ray, anti-Stokes ray) generated in each portion of the optical fiber 15. The Raman scattering ray has temperature dependency, so that a temperature at a specific position of the optical fiber 15 can be measured based on the temperature dependency and a time during which the optical pulses are incident, and the Raman scattering ray is measured. It is noted that temperature measuring instruments in which the above-mentioned optical fiber is used are commercially available, and accordingly the detailed description is omitted herein.

When the control means 5 receives a load request (heat energy transport request) of the heat demand end 3, the control means 5 searches for the heat media 6 having heat energy that can satisfy the load request received, based on the temperature distribution acquired by the temperature distribution acquisition means 4. Then, for example, the control means 5 notifies the heat demand end 3 of an estimated arrival time, at which the heat medium 6 having heat energy that can satisfy the load request received reaches the heat demand end 3 that makes the load request. When the estimated arrival time notified has come, the heat demand end 3 that receives the notification takes out the heat energy from the heat medium 6 (the heat medium 6 having the heat energy that can satisfy the load request) in the heat medium transport path 1.

For example, in a case where the heat packet that can satisfy the load request of the heat demand end 3 is the heat medium 12b of 10 degrees C. illustrated in FIG. 1, when the heat medium 12b of 10 degrees C. reaches the heat demand end 3, the control means 5 allows the heat demand end 3 to take out the heat energy from the heat medium 12b of 10 degrees C.

It is noted that, in a section (a temperature mixture area 11 in FIG. 1) where the heat packets having different temperatures come in contact with each other, when the heat media on the bilateral sides are mixed with a lapse of time, and the time further elapses (that is, when the transfer distance of the heat media 6 is increased), the length of the temperature mixture area 11 is extended. Also, when the heat packets having different temperatures are sequentially transported, the temperature of the wall surface of the heat medium transport path 1 are consecutively changed in accordance with the temperatures of the heat packets. The above-mentioned temperature change of the wall surface of the heat medium transport path 1 occurs due to the transfer of the heat energy between the heat packets and a wall surface of the heat medium transport path 1 when the downstream side end portion of the heat packets and the wall surface of the heat medium transport path 1 are brought into contact with each other. That is, the temperature change acts on the increase in the length of the temperature mixture area 11.

Figure 2:
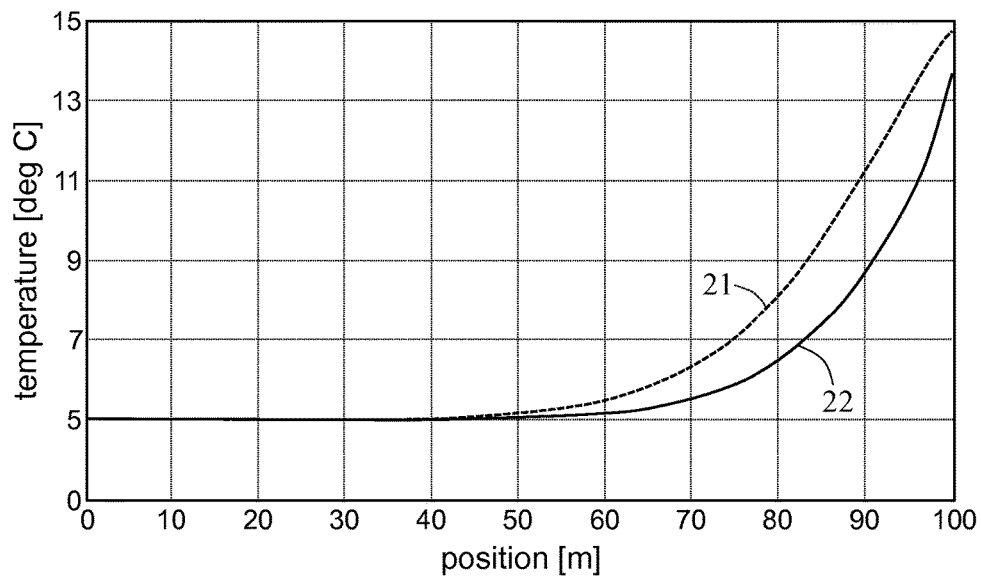
FIG. 2 is a diagram illustrating one example of the temperature mixture area of the present invention.

For example, FIG. 2 is a diagram illustrating the temperature distribution of the wall surface of a steel pipe and the heat media in a case where the heat media (herein, water) whose temperature is 5 degrees C. is infused from one end (position 0) into the steel pipe (size: 200 A) whose length is 100 m, and whose wall surface temperature is 15 degrees C. (herein, the heat media of 15 degrees C. are filled) at a flow rate of 1 m/sec, in a specific position in the heat medium transport path 1. In FIG. 2, a horizontal axis represents the position of the steel pipe, and a vertical axis represents the temperature. Also, in FIG. 2, a dash line 21 represents the temperature distribution of the wall surface of the steel pipe, and a solid line 22 represents the temperature distribution of the heat medium. It is noted that, FIG. 2 represents the state of a state after a lapse of 99.7 second from the start of infusion of the heat medium (that is, the length of the heat packet is 99.7 m).

Figure 3:
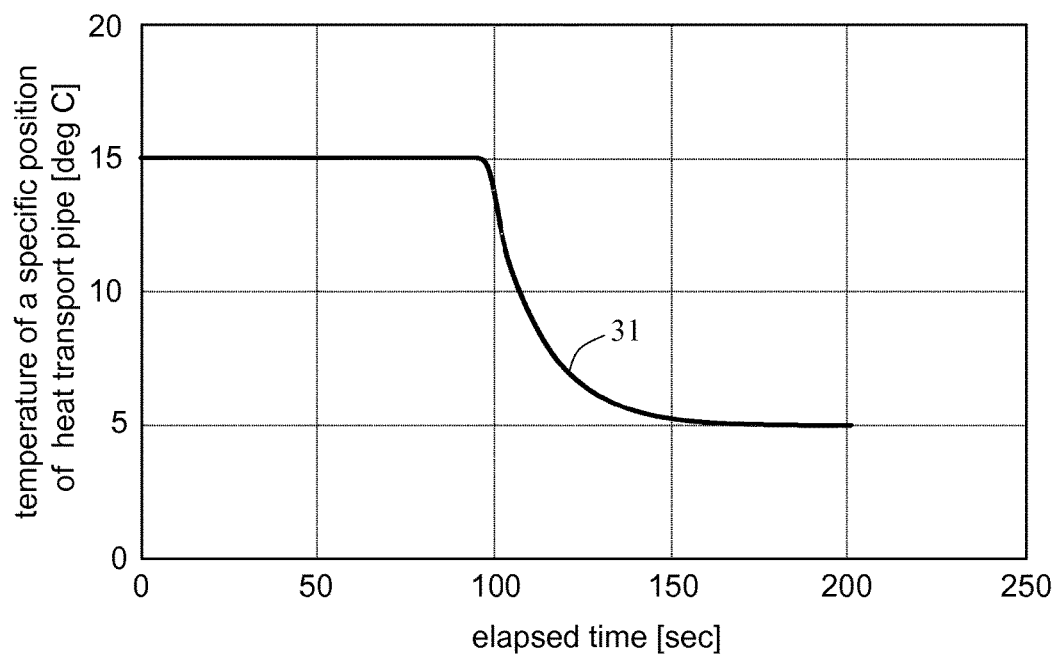
FIG. 3 is a diagram illustrating one example of the temperature mixture area of the present invention.

Also, FIG. 3 is diagram illustrating the temperature of the heat medium at a position of 100 m in FIG. 2. In FIG. 3, a horizontal axis represents an elapsed time, and a vertical axis represents the temperature. It is noted that, herein, the temperature is an average temperature in the cross section of the steel pipe at the position of 100 m.

As can be seen from the solid line 22 in FIG. 2, the temperature of the heat medium increases 2 degrees C. or higher in an approximate range of 15 m from the tip end of the heat medium infused, and it is understandable that the temperature mixture area 11 is formed. Also, as can be seen from the solid line 31 in FIG. 3, regarding the heat medium that passes through the point of the position of 100 m, when approximately 90 seconds are elapsed from the start of the infusion of the heat medium of 5 degrees C., the temperature starts to be reduced, and when approximately 150 seconds are elapsed, the temperature reaches 5 degrees C. That is, it is understandable that the heat medium, which passes while taking a time of approximately 40 to 50 seconds (that is, the length of 40 to 50 m), is formed as the temperature mixture area 11.

The control means 5 takes into consideration of the variation depending on the transport distance of the above-mentioned temperature mixture area 11 based on the temperature of a heat packet advancing immediately ahead and calculates the estimated arrival time of the heat media 6 to the heat demand end 3. It is noted that the estimated arrival time can be calculated based on the temperature distribution in the heat medium transport path 1 at a specific time, a distance between the heat demand end 3 and the heat media 6 regarding each temperature in the temperature distribution, and a transport speed of the heat media 6 in the heat medium transport path 1. Also, as described later, when the temperature distribution can be acquired by the temperature distribution acquisition means 4 in real time, the control means 5 may detect the arrival of the heat media 6 to the heat demand end 3 based on the temperature distribution.

Regarding the above-mentioned heat energy transport system 10, the heat packets having different temperatures are transported in the heat medium transport path 1. That is, the heat energy can be transported in a state where the heat packets, to which different heat energy is applied, are coexisted in the heat medium transport path 1. Accordingly, for example, the heat energy that becomes redundant in the building connected to the heat energy transport system 10, or the heat energy that remains after being used in the building can be arbitrarily transported to other buildings. Accordingly, a small amount of heat energy or waste heat, which has been conventionally discarded, can be effectively utilized. As a result, the primary side energy of the heat source can be substantially reduced. Also, heat energy suppliers and heat energy users are easily identified, so that charge can be relatively easily carried out.

Figure 4:
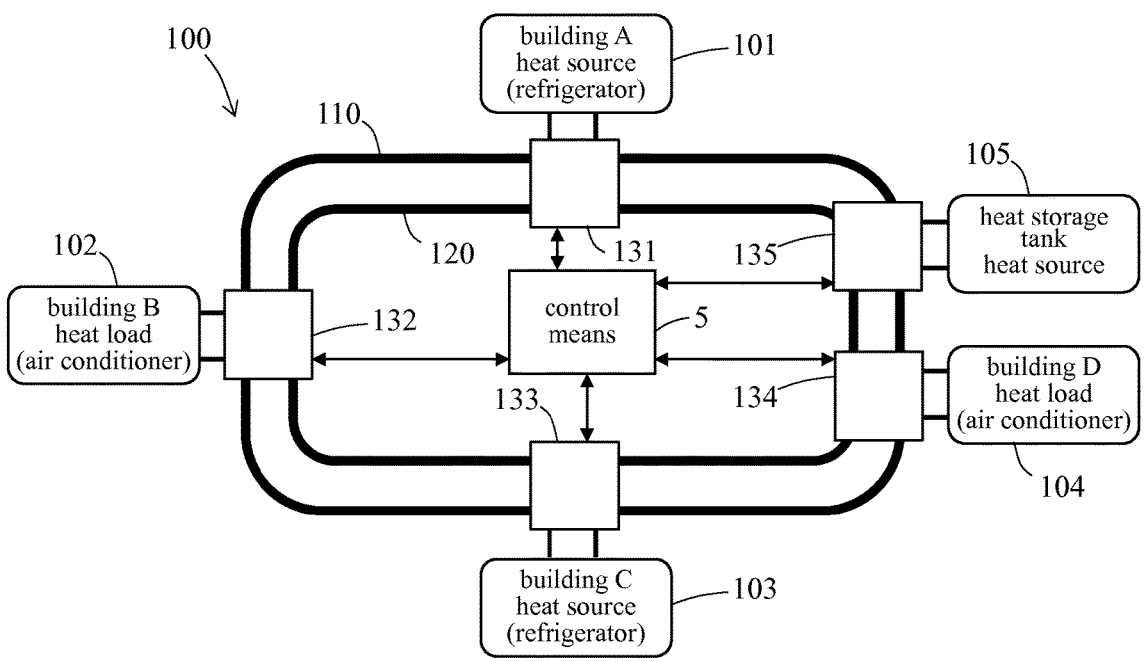
FIG. 4 is a schematic configuration diagram illustrating the entire constitution of a heat interchange system in an embodiment of the present invention.

Subsequently, a heat interchange system, in which the above-mentioned principle of the heat energy transport is used, will be described. FIG. 4 is a diagram illustrating one example of the heat interchange system in an embodiment of the present invention. It is noted that, hereinafter, a case where air cooling is carried out by the system will be described.

As illustrated in FIG. 4, the heat interchange system 100 of the present embodiment includes an annular first heat medium transport path 110 and an annular second heat medium transport path 120. The first heat medium transport path 110 and the second heat medium transport path 120 transport the heat media 6 to which the heat energy is applied.

Heat sources and heat demand ends are connected to the first heat medium transport path 110 and the second heat medium transport path 120. Herein, as one example, heat sources 101, 103, and 105 are represented as heat sources (heat supply ends), and heat loads 102 and 104 are represented as the heat demand ends. It is noted that the heat source 101 is made up of a heat source constituted by a refrigerator included in a building A, and the heat source 103 is made up of a heat source constituted by a refrigerator included in a building C. The heat source 105 is made up of a heat source constituted by a multi-step form thermal storage water tank described later. Also, the heat load 102 is made up of a heat load constituted by an air conditioner included in a building B, and the heat load 104 is made up of a heat load constituted by an air conditioner included in a building D. It is noted that, herein, the buildings A and C are assumed as the heat sources, and the buildings B and D are assumed as the heat demand ends, but the air conditioners included in the buildings A and C may be applied as the heat loads. Also, for example, when the buildings B and D include the refrigerator for air conditioning and the like, the buildings B and D can be applied as the heat sources.

The heat sources 101, 103, and 105, and the heat loads 102 and 104 are connected to the first heat medium transport path 110 and the second heat medium transport path 120 via connection portions 131, 132, 133, 134, and 135. The connection portions 131 to 134 include a function of supplying the heat energy generated in the heat source of each building to the heat media in the first heat medium transport path 110 and the second heat medium transport path 120 and a function of acquiring the heat energy from the heat media in the first heat medium transport path 110 and the second heat medium transport path 120. Also, the connection portion 135 includes a function of infusing the heat media in the first heat medium transport path 110 and the second heat medium transport path 120 into any one of steps of the multi-step form thermal storage water tank and a function of infusing the heat media from any one of steps of the multi-step form thermal storage water tank into the first heat medium transport path 110 and the second heat medium transport path 120. The structure of the connection portions 131 to 135 is described later.

In the first heat medium transport path 110 and the second heat medium transport path 120, as illustrated in FIG. 1, the heat media are distributed in the state of having temperatures that are different from each other. That is, the heat media are transported as the heat packets in the first heat medium transport path 110 and the second heat medium transport path 120. It is noted that the above-mentioned optical fiber 15 that acquires the temperature distribution of the heat media in each transport path is installed in the interior of the first heat medium transport path 110 and the second heat medium transport path 120, and the distribution of the heat packets in the first heat medium transport path 110 and the second heat medium transport path 120 is acquired by the above-mentioned temperature distribution acquisition means 4 (not illustrated).

The above-mentioned control means 5 is connected to the above-mentioned temperature distribution acquisition means 4 not illustrated and the connection portions 131 to 135 in a state of being capable of transmitting and receiving data, and as described above, the control means 5 receives the load request of the heat load 102 or the heat load 104, which is the heat demand end, and when the heat packet that can satisfy the load request received arrives at the connection portion of the heat load that makes the load request, based on the temperature distribution (distribution of the heat packets) acquired by the temperature distribution acquisition means 4, the control means 5 allows the heat demand end to take out the heat energy from the heat packet arrived via the connection portion.

It is noted that the control means 5, for example, can be realized by an exclusive arithmetic circuit, or by hardware that includes a processor and memories such as a RAM (Random Access Memory) or a ROM (Read Only Memory), etc. and software stored in the memories and operating on the processor.

Also, although not specifically limited, in the present embodiment, the first heat medium transport path 110 mainly plays a role of transporting the heat media (heat media having a low temperature) to which the heat energy generated by the heat source (refrigerator) is applied, or the heat media having a temperature which is not remarkably different from the temperature of the above-mentioned heat media (for example, the difference in temperatures is within 3 degrees C.). Also, the second heat medium transport path 120 mainly plays a role of transporting the heat media of which the heat energy is utilized, and the temperature is increased. Accordingly, hereinafter, the first heat medium transport path 110 is appropriately referred to as "supply loop 110", and the second heat medium transport path 120 is appropriately referred to as "return loop 120", in order to express each role.

Figure 5:
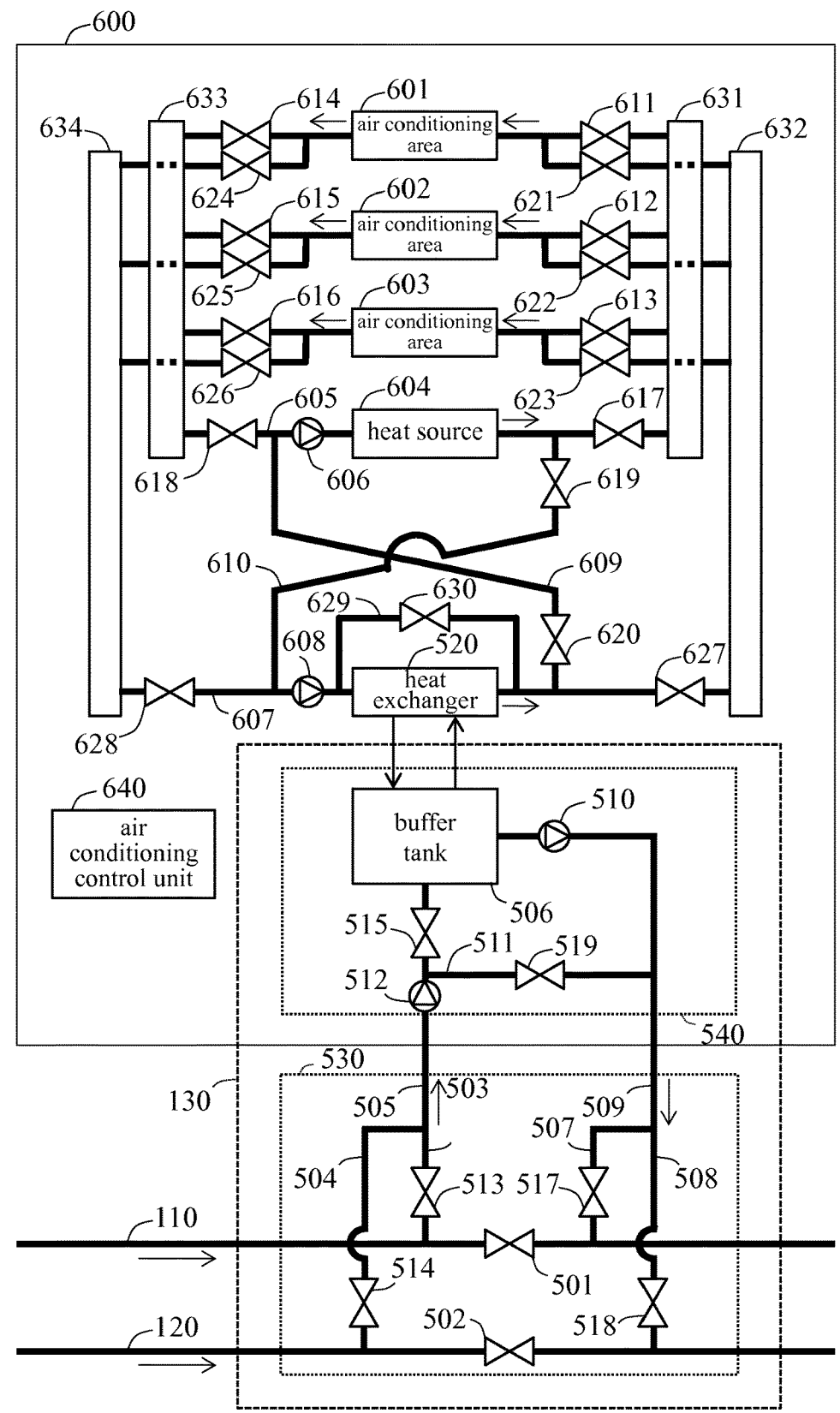
FIG. 5 is a schematic configuration diagram illustrating a thermal router in an embodiment of the present invention.

FIG. 5 is a diagram illustrating one example of the constitution of the connection portions 131 to 134. The constitution of the connection portions 131 to 134 is similar, and accordingly, the connection portion 130 is representatively illustrated herein. Also, FIG. 5 represents the heat source (herein, refrigerator) and the heat load (air conditioning area inclusive of an air conditioner) in the interior of the building connected to the supply loop 110 and the return loop 120 by means of the connection portion 130. It is noted that the constitution of the interior of the building illustrated in FIG. 5 can be applied to all of the building A that includes the heat source 101, the building B that includes the heat load 102, the building C that includes the heat source 103, and the building D that includes the heat load 104. However, the heat sources 101 and 103 only need to include at least the heat source illustrated in FIG. 5, and the heat loads 102 and 103 only need to include at least the heat load (air conditioner) illustrated in FIG. 5.

As illustrated in FIG. 5, a connection portion 130 of the present embodiment includes an open-and-close valve 501 interposed in the supply loop 110 and an open-and-close valve 502 interposed in the return loop 120. It is noted that, herein, although the open-and-close valve 501 and the open-and-close valve 502 are adopted, any valve may be applied as long as the valve can prevent the heat medium infused from advancing on the upstream side in a case where the heat medium is infused into the supply loop 110 or the return loop 120 on the downstream side of the valve, and as long as the valve can prevent the heat medium on the downstream side from being extracted in a case where the heat medium is extracted from the supply loop 110 or the return loop 120 on the upstream side of the valve. Accordingly, a check valve and the like can be used. Although the structure of the open-and-close valve is not specifically limited as long as the flow path is switched between an open state and a closed state, the open-and-close valve of an electromagnetic type is used herein.

Also, the connection portion 130 includes a supply loop side introduction path 503 whose one end is connected to the upstream side of the open-and-close valve 501 of the supply loop 110 and a return loop side introduction path 504 whose one end is connected to the upstream side of the open-and-close valve 502 of the return loop 120. The other ends of the supply loop side introduction path 503 and the return loop side introduction path 504 are both connected to one end of a common introduction path 505, and the other end of the common introduction path 505 is connected to an open-type buffer tank 506. Furthermore, the connection portion 130 includes a supply loop side lead-out path 507 whose one end is connected to the downstream side of the open-and-close valve 501 of the supply loop 110 and a return loop side lead-out path 508 whose one end is connected to the downstream side of the open-and-close valve 502 of the return loop 120. The other ends of the supply loop side lead-out path 507 and the return loop side lead-out path 508 are both connected to one end of a common lead-out path 509, and the other end of the common lead-out path 509 is connected to the buffer tank 506.

Open-and-close valves 513, 514, 515, 517, and 518 are respectively interposed in the supply loop side introduction path 503, the return loop side introduction path 504, the common introduction path 505, the supply loop side lead-out path 507, and the return loop side lead-out path 508. Also, a pump 512 that delivers the heat medium to the side of the open-and-close valve 515 (the direction oriented from the one end side to the other end side of the common introduction path 505) is provided on the upstream side of the open-and-close valve 515 interposed in the common introduction path 505. Also, a pump 510 that delivers the heat medium from the buffer tank 506 to the side of the supply loop side lead-out path 507 and the return loop side lead-out path 508 is interposed in the other end of the common lead-out path 509. The pump 510 and the pump 512 have functions of delivering the heat media to the supply loop 110 or the return loop 120 and transporting the heat media existed in the supply loop 110 or the return loop 120, by means of the above-mentioned delivering, to the downstream side. It is noted that the pump 510 and the pump 512 only need to deliver the heat media at the same flow rate as that of other pumps that operate as a pair, as described later, and the constitution of the pump 510 and the pump 512 is not specifically limited.

Also, the common introduction path 505, between the open-and-close valve 515 and the pump 512, and the common lead-out path 509 on the downstream side of the pump 510 are connected with a bypass flow path 511, and an open-and-close valve 519 is interposed in the bypass flow path 511. In the present embodiment, the delivery and acceptance of the heat energy between the heat medium accumulated in the buffer tank 506 and the heat medium of the heat energy transport system on the building side are carried out by a heat exchanger 520. Also, it is configured that the temperature of the heat medium in the buffer tank 506 is periodically acquired by a temperature sensor not illustrated, and the temperature acquired is appropriately informed to the control means 5 via a buffer tank information acquisition means as described later.

It is noted that, hereinafter, regarding the above-mentioned connection portion 130, a section that includes the open-and-close valves 501, 502, 513, 514, 517, and 518 is appropriately referred to as a thermal router 530, and a section that includes the open-and-close valves 515 and 519, the buffer tank 506, the pump 510, the pump 512, and the bypass flow path 511 is appropriately referred to as a thermal packet storage 540.

Although not specifically limited, but in the present embodiment, the heat energy transport system in the building A includes an air conditioning area 601, an air conditioning area 602, an air conditioning area 603, and a heat source 604. The air conditioning areas 601 to 603 include one or a plurality of indoor instruments (air conditioners), and the heat medium are supplied from the same heat medium supply path to the indoor instruments that belong to the same air conditioning area. For example, one air conditioning area can be corresponded to one floor of a building. Also, each one of air conditioning areas can be provided for the specific section (for example, an east side section or a west side section) of one floor. The above-mentioned constitution is known, and its detailed description is omitted herein. It is noted that, although the illustration is omitted herein, the air conditioning areas 601 to 603 include pipes that supply the heat medium to each indoor instrument that belongs to the same air conditioning area, a valve (a flow rate control valve), and a secondary pump, besides the indoor instruments.

The heat medium introducing side of the air conditioning areas 601 to 603 is connected to the heat source 604 via a first header 631 and connected to the heat exchanger 520 via a second header 632. Open-and-close valves 611 to 613 are respectively provided in the heat medium introduction paths that connect the first header 631 with the air conditioning areas 601 to 603, and open-and-close valves 621 to 623 are respectively provided in the heat medium introduction paths that connect the second header 632 with the air conditioning areas 601 to 603. These open-and-close valves 611 to 613 and 621 to 623 have a function of supplying any one of the heat medium to which the heat energy is applied by the heat source 604 or the heat medium to which the heat energy is applied by the heat exchanger 520, to the air conditioning areas 601 to 603. Also, an open-and-close valve 617 is provided in the heat medium introduction path that connects the first header 631 with the heat source 604, and an open-and-close valve 627 is provided in the heat medium introduction path that connects the second header 632 with the heat exchanger 520. It is noted that the open-and-close valves 617 and 627 are constituted by a flow rate control valve that can control the flow rate.

Similarly, the heat medium lead-out side of the air conditioning areas 601 to 603 is connected to the heat source 604 via a third header 633 and connected to the heat exchanger 520 via a fourth header 634. Open-and-close valves 614 to 616 are respectively provided in the heat medium lead-out paths that connect the third header 633 with the air conditioning areas 601 to 603, and open-and-close valves 624 to 626 are respectively provided in the heat medium lead-out paths that connect the fourth header 634 with the air conditioning areas 601 to 603. These open-and-close valves 614 to 616 and 624 to 626 have a function of supplying the heat medium, which are used in the air conditioning areas 601 to 603, to any one of the heat source 604 or the heat exchanger 520.

It is noted that a pump 606 that delivers the heat medium to the side of the heat source 604 is provided in a common lead-out path 605 that connects the third header 633 with the heat source 604, and a pump 608 that delivers the heat medium to the side of the heat exchanger 520 is provided in a common lead-out path 607 that connects the fourth header 634 with the heat exchanger 520. Also, an open-and-close valve 618 is provided between the third header 633 and the common lead-out path 606, and an open-and-close valve 628 is provided between the fourth header 634 and the pump 608. Furthermore, a heat medium flow path 609 is provided that connects the middle between the pump 606 and the open-and-close valve 618 with the downstream side of the heat exchanger 520, and a heat medium flow path 610 is provided that connects the middle between the pump 608 and the open-and-close valve 628 with the downstream side of the heat source 604. The heat medium to which the heat energy is applied by the heat source 604 are directly introduced to the heat exchanger 520 through the heat medium flow paths 609 and 610, thereby constituting the flow paths that guide the heat medium after the heat exchange to the heat source 604. Also, a heat exchanger bypass flow path 629 is provided that connects the bilateral ends of the heat exchanger 520. Open-and-close valves 620, 619, and 630 are respectively interposed in the heat medium flow path 609, the heat medium flow path 610, and heat exchanger bypass flow path 629. It is noted that the open-and-close valves 618, 628, 619, 620, and 630 are constituted by a flow rate control valve that can control the flow rate.

It is noted that the operation (the opening/closing and the flow rate adjustment of each open-and-close valve, on/off of pumps, and the control of heat sources and heat exchangers) of each constituent element in the building 600 illustrated in FIG. 5 is controlled by an air conditioning control unit 640 that is provided in the building 600 and controls the air conditioning in the building 600. The air conditioning control unit 640, for example, can be realized by an exclusive arithmetic circuit, or by hardware that includes a processor and memories such as a RAM (Random Access Memory) or a ROM (Read Only Memory), etc. and software stored in the memories and operating on the processor.

Regarding the constitution illustrated in FIG. 5, for example, when a request for air cooling is received from an indoor instrument that belongs to the air conditioning area 602 installed in a specific tenant and the like, the indoor instrument notifies the air conditioning control unit 640 of operation method information such as setting temperatures requested and quick cooling. The air conditioning control unit 640 that receives the notification specifies an air conditioning area to which the indoor instrument belongs, and acquires a temperature and humidity at the time point in the place (room) in which the indoor instrument is installed, by means of a temperature sensor and a humidity sensor not illustrated. The air conditioning control unit 640 supplies any of the heat medium to which the heat energy is applied by the heat source 604, or the heat medium to which the heat energy is applied by the heat exchanger 520, to the air conditioning area 602 to which the indoor instrument belongs, based on the setting temperature, the operation method information, the temperature and the humidity acquired. In the present embodiment, the air conditioning control unit 640 is connected to the above-mentioned control means 5 in such a manner as to be capable of communicating with each other, and the air conditioning control unit 640 transmits the setting temperature, the operation method information, the temperature and the humidity acquired (or heat energy conditions that are determined based on these and required to be included by the heat medium supplied to the air conditioning area to which a request source belongs) to the control means 5. For example, the control means 5 determines the optimal method for the conditions received and replies to the air conditioning control unit 640, from the designated viewpoints such as the lowest expense or the highest increase of the energy efficiency of the region where the heat interchange system 100 is installed, based on the operation state of the heat source of another building, the state of the heat medium in the buffer tank, and the distribution of the heat packets in the supply loop 110 and the return loop 120. Based on the reply, the air conditioning control unit 640 determines which of the heat medium to which the heat energy is applied by the heat source 604, or the heat medium to which the heat energy is applied by the heat exchanger 520, is supplied to the air conditioning area 602 to which the indoor instrument of the request source belongs.

For example, when the heat source 604 is used, the air conditioning control unit 640 brings the open-and-close valves 617, 612, 615, and 618 into an open state (other open-and-close valves into a closed state) and supplies the heat medium, to which the heat energy is applied by the heat source 604, to the air conditioning area 602 to which the indoor instrument of the request source belongs, through the first header 631. In this case, the heat medium, whose temperature is increased due to utilization in the air conditioning area 602, is returned to the heat source 604 through the third header 633. It is noted that the circulation of the heat medium is carried out by driving the pump 606.

Also, when the heat exchanger 520 is used, the air conditioning control unit 640, for example, brings the open-and-close valves 627, 622, 625, and 628 into an open state (other open-and-close valves into a closed state) and supplies the heat medium, to which the heat energy acquired from the heat medium in the buffer tank 506 is applied by the heat exchanger 520, to the air conditioning area 602 through the second header 632. In this case, the heat medium, whose temperature is increased due to the utilization in the air conditioning area 602, is returned to the heat exchanger 520 through the fourth header 634. It is noted that the circulation of the heat medium is carried out by driving the pump 608.

Also, when the temperature of the heat medium used in other air conditioning areas 601 or 603 is not substantially increased, and the heat medium satisfy the heat energy condition of the air conditioning area 602, the heat medium may be recycled in the air conditioning area 602. For example, when the heat medium supplied from the heat source 604 and used in the air conditioning area 601 is recycled in the air conditioning area 602, the air conditioning control unit 640 brings the open-and-close valves 627, 622, 624, 628, and 630 into an open state (other open-and-close valves into a closed state) and supplies the heat medium used in the air conditioning area 601 to the air conditioning area 602 through the fourth header 634 and the second header 632. The air conditioning control unit 640 can determine whether or not this operation is possible, for example, by monitoring the temperature of a refrigerant in the second header 632 and the fourth header 634. It is noted that the circulation of the heat medium is carried out by driving the pump 608.

On the other hand, as described above, regarding the constitution in which the optimal method is determined by the control means 5, a case occurs where the heat source 604 of the building 600 applies the heat energy to other buildings in response to the request of other buildings. In this case, the air conditioning control unit 640 brings the open-and-close valves 619 and 620 into an open state (other open-and-close valves into a closed state) and supplies the heat medium, to which the heat energy is applied by the heat source 604, to the heat exchanger 520 through the heat medium flow path 610. In the heat exchanger 520, the heat energy is transferred to the heat medium in the buffer tank 506, and the heat medium whose temperature is increased are returned to the heat source 604 through the heat medium flow path 609. It is noted that the circulation of the heat medium is carried out by driving the pumps 606 and 608. It is noted that a method of transporting the heat medium from the buffer tank 506 to other buildings is described later.

Figure 6:
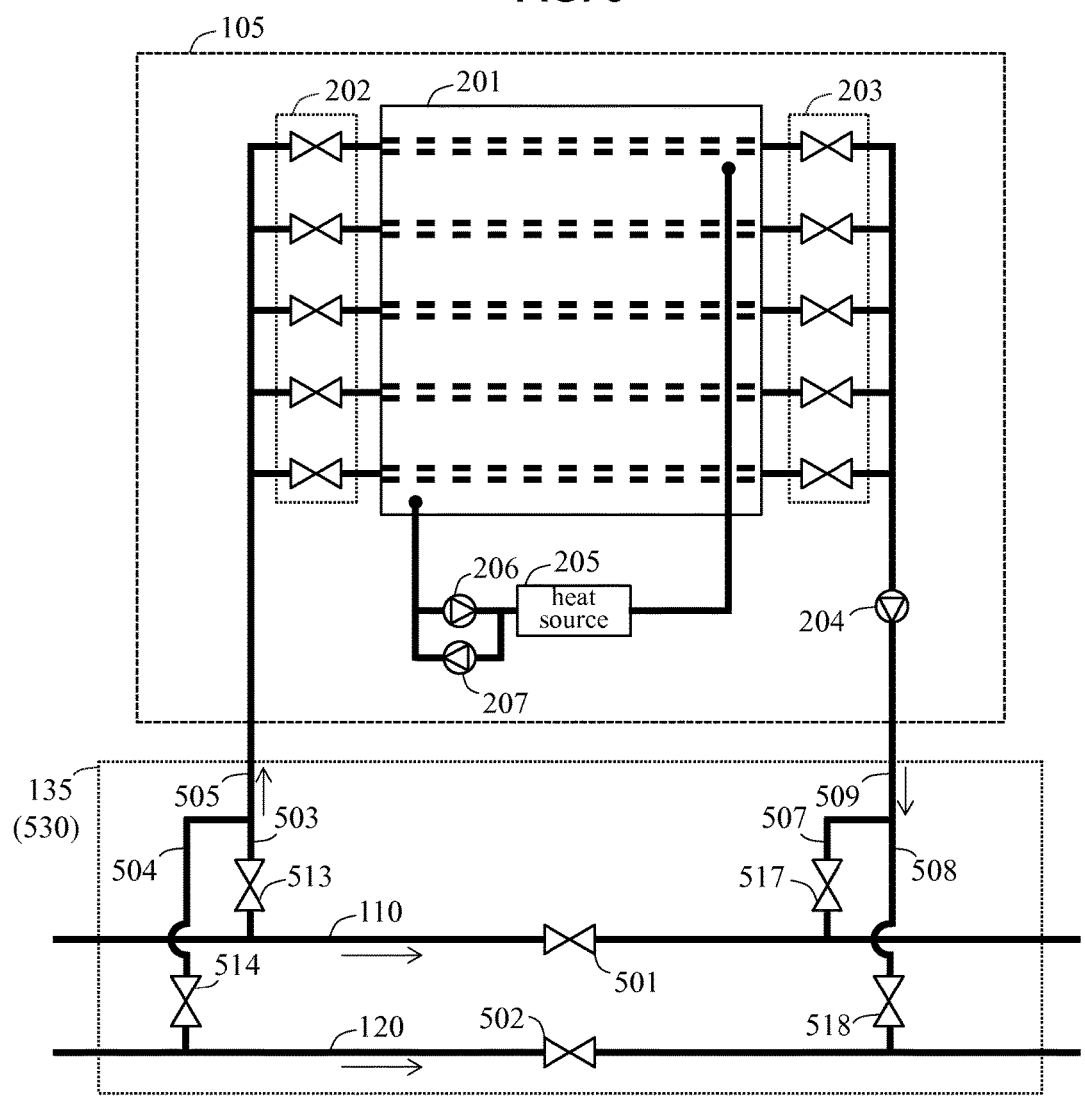
FIG. 6 is a schematic configuration diagram illustrating a multi-step form thermal storage water tank in an embodiment of the present invention.

Subsequently, the connection portion 135 and the heat source 105 (multi-step form thermal storage water tank) will be described. FIG. 6 is a diagram illustrating one example of the constitution of the connection portion 135 and the multi-step form thermal storage water tank. First, the multi-step form thermal storage water tank of thermal stratification type will be described. The multi-step form thermal storage water tank (heat source 105) includes a large-size, open-type water tank 201 that has a predetermined height, utilizes the temperature dependency of the specific gravity of the heat medium, distributes the heat media having various temperatures in the vertical direction, and accumulates the heat media. That is, the heat medium having the temperature of a low specific gravity is accumulated on the upper portion of the water tank 201, and the heat medium having the temperature of a high specific gravity is accumulated on the bottom portion of the water tank 201.

The water tank 201 includes an infusion open-and-close valve group 202 provided at regular intervals in the height direction and a delivery open-and-close valve group 203 provided at regular intervals in the height direction. Herein, the open-and-close valve groups 202 and 203, each of which is made up of five open-and-close valves, are exemplified, but the number of open-and-close valves and the intervals between the open-and-close valves, which belong to the open-and-close valve groups 202 and 203, are not specifically limited. In the example, infusion open-and-close valves and delivery open-and-close valves are provided in a corresponding manner based on the same height, and the spaces between the infusion open-and-close valves and the delivery open-and-close valves provided in a corresponding manner in the water tank 201 are connected by perforated pipes that include a multitude of through holes on the pipe wall thereof. That is, the perforated pipes are arranged in a state of maintaining a predetermined height in the water tank 201. The infusion and delivery of the heat media are carried out through the above-mentioned perforated pipes, which make it possible to carry out the infusion and delivery at a low flow rate that does not disturb the temperature distribution in the water tank 201.

It is noted that, as illustrated in FIG. 6, the connection portion 135 of the present embodiment has the same constitution as that of the above-mentioned thermal router 530. The other end of the common introduction path 505 is connected to the infusion open-and-close valve group 202, and the other end of the common lead-out path 509 is connected to the delivery open-and-close valve group 203. Also, a pump 204 that delivers each of the heat media in the water tank 201 to the supply loop 110 or the return loop 120 is interposed in the common lead-out path 509.

Temperature sensors not illustrated are provided at regular intervals in the height direction of the water tank 201, and one of the open-and-close valves in the infusion-side corresponding to a temperature, which is the closest to the heat packet (the heat medium) drawn out from the supply loop 110 or the return loop 120, is brought into an open state, thereby infusing the heat medium into the water tank 201. In this case, the liquid level (water level) of the heat media in the water tank 201 is raised along with the infusion of the heat medium. Also, one of the open-and-close valves in the delivery-side corresponding to a temperature, which is closest to the heat packet (the heat medium) delivered to the supply loop 110 or the return loop 120, is brought into an open state, thereby delivering the heat medium to the supply loop 110 or the return loop 120. In this case, the liquid level of the heat media in the water tank 201 descends along with the delivery of the heat medium.

Also, a heat medium transport path connected to a heat source 205, which applies the heat energy to the heat media accumulated in the water tank 201, is connected to the bottom portion and the upper portion of the water tank 201. For example, when the heat source 205 cools the heat media in the water tank 201, the pump 207 is driven, and the heat medium in the water tank 201 are drawn out from the upper portion of the water tank 201 and supplied to the heat source 205. The heat medium, to which the heat energy is applied by the heat source 205, is infused into the bottom portion of the water tank 201. In contrast, when the heat source 205 heats the heat media in the water tank 201, the pump 206 is driven, and the heat medium in the water tank 201 is drawn out from the bottom portion of the water tank 201 and supplied to the heat source 205. The heat medium, to which the heat energy is applied by the heat source 205, is infused into the upper portion of the water tank 201.

Figure 7:
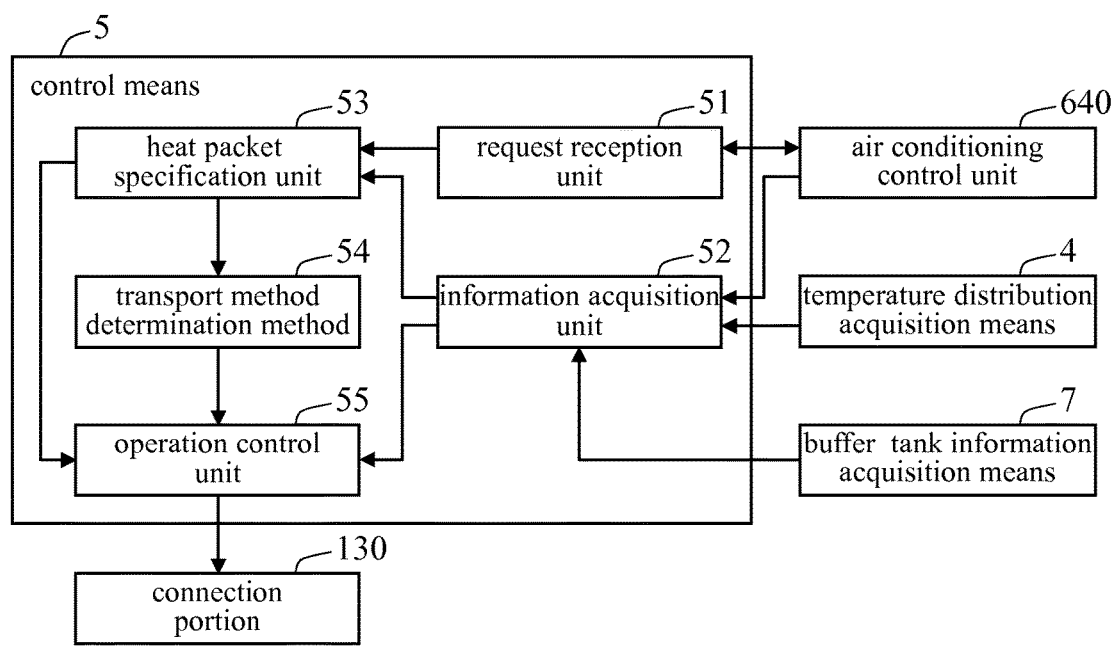
FIG. 7 is a functional block diagram illustrating one example of a control means in an embodiment of the present invention.

Subsequently, the constitution of the control means 5 will be described. The above-mentioned control means 5, for example, can be constituted by a general purpose computer. FIG. 7 is a functional block diagram of the control means 5 of the present embodiment. As illustrated in FIG. 7, the control means 5 of the present embodiment includes a request reception unit 51, an information acquisition unit 52, a heat packet specification unit 53, a transport method determination unit 54, and an operation control unit 55. These units, for example, can be realized such that a CPU utilizes the RAM as an operation area and executes programs stored in the ROM.

As described above, the request reception unit 51 receives heat energy requirement conditions such as the setting temperature, the operation method information, the temperature and the humidity in the air conditioning position to be targeted (or the heat energy conditions that are determined based on these and required to be included by the heat medium supplied to the air conditioning area to which a request source belongs), which is transmitted by the air conditioning control unit 640 included in each building.

The information acquisition unit 52 is connected to the above-mentioned temperature distribution acquisition means 4 and a buffer tank information acquisition means 7 that acquires the temperature and quantity of the heat medium stored in the buffer tank 506 included in each building, in such a manner as to be capable of communicating with each other. The information acquisition unit 52 appropriately acquires the temperature distribution in the supply loop 110 or the return loop 120, which is acquired by the temperature distribution acquisition means 4, and the temperature and quantity of the heat medium stored in the buffer tank 506 included in each building, which is acquired by the buffer tank information acquisition means 7, at a predetermined sampling time, and retains the information acquired. Also, the information acquisition unit 52 is connected to the air conditioning control unit 640 included in each building and appropriately acquires the operational state of the heat source included in each building at a predetermined sampling time and retains the information acquired. It is noted that the operational state of the heat source means arbitrary information on the comparison advantages with disadvantages in view of other heat sources, such as the information on the heat energy generation capability (surplus capacity of generation), the information indicating the relation of heat energy generation to operation efficiency, and the information on the primary side energy amount being consumed, besides the information on whether or not the operation is performed or stopped.

The heat packet specification unit 53 specifies the heat packet that satisfies the heat energy requirement conditions received by the request reception unit 51, based on the heat energy requirement conditions received by the request reception unit 51 and various pieces of information retained by the information acquisition unit 52. A path and a method of transporting the heat packet specified by the heat packet specification unit 53 to the request source are determined by the transport method determination unit 54, and the operation control unit 55 controls the operation of the connection portion 130 in each building, thereby realizing the heat packet transport based on the transport path and the transport method determined.

Subsequently, the procedure of the heat interchange in the heat interchange system 100 including the above-mentioned constitution will be described.

As described above, the heat interchange system 100 of the present embodiment takes out the heat medium from the supply loop 110 or the return loop 120 and utilizes the heat energy in the buildings that belong to the heat interchange system 100. With this constitution, in one building (for example, the building B, which is the heat load 102 in FIG. 5), for example, when the heat medium is simply taken out from the supply loop 110, the amount of heat media is reduced in the supply loop 110. That is, space in which the heat medium do not exist in the supply loop 110 is generated, and the heat media in the supply loop 110 are flown into the space, so that the above-mentioned heat packet form cannot be maintained.

Also, in one building (for example, the building A, which is the heat source 101 in FIG. 5), for example, in a case where the heat medium is delivered to the supply loop 110 in order to interchange the heat energy with other building, when the heat media are filled in the supply loop 110, space that allows the heat medium to be infused into the supply loop 110 does not exist. That is, the heat medium cannot be infused into the supply loop 110.

Accordingly, regarding the buildings that belong to the heat interchange system 100, in order to make it possible to take out the heat medium from the supply loop 110 or the return loop 120 and utilize the heat energy, when the heat medium is taken out, it is necessary to infuse the heat medium of the same amount from other building on the upstream side to the heat medium transport path (the supply loop 110 or the return loop 120), which is targeted for taking out the heat medium. Similarly, in order to make it possible to deliver the heat medium to the supply loop 110 or the return loop 120 and interchange the heat energy with other building, when the heat medium is delivered, it is necessary to take out the heat medium of the same amount in other building on the downstream side from the heat medium transport path (the supply loop 110 or the return loop 120), which is targeted for delivering the heat medium. That is, it becomes necessary to maintain the balance of the heat media constant at least in a specific section of the heat medium transport path (the supply loop 110 or the return loop 120).

Figure 8:
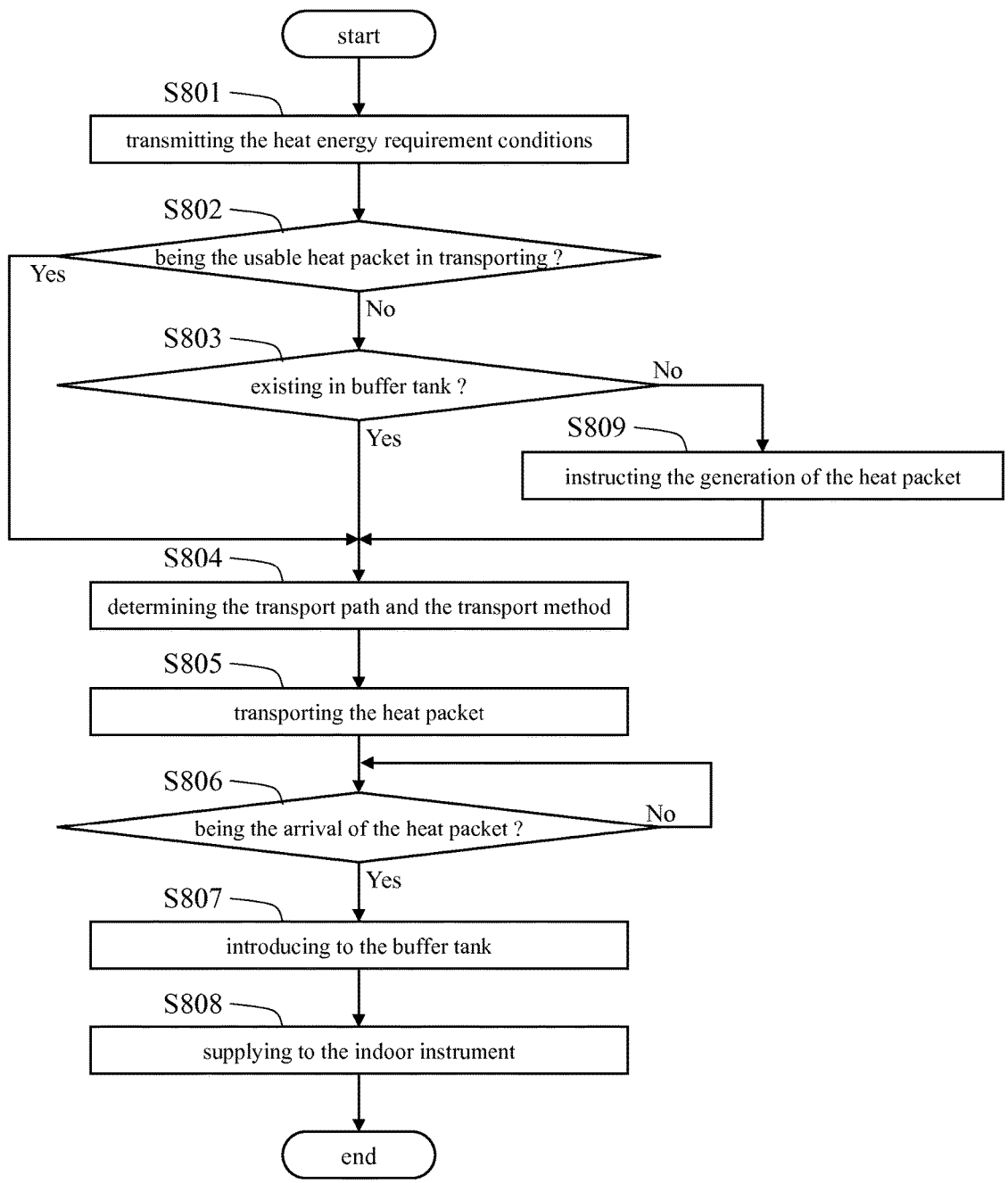
FIG. 8 is a flowchart diagram illustrating one example of an intraregional heat interchange procedure executed by the heat interchange system in an embodiment of the present invention.

In view of the above-mentioned presupposition, hereinafter, the procedure of the heat interchange in the heat interchange system 100 will be described. FIG. 8 is a flowchart diagram illustrating one example of an intraregional heat interchange procedure executed by the heat interchange system 100. For example, the procedure starts as a trigger that the heat energy request is generated in the air conditioning control unit 640 of the building that belongs to the heat interchange system 100.

When the procedure starts, as described above, the air conditioning control unit 640 transmits the heat energy requirement conditions as the load request to the control means 5 (Step S801).

When the load request is received by the request reception unit 51 of the control means 5, the request reception unit 51 inputs the request to the heat packet specification unit 53. The heat packet specification unit 53 that receives the input searches the heat packet that satisfies the conditions received, in the heat interchange system 100 managed by itself, based on the information retained by the information acquisition unit 52. Regarding the search, first, the heat packet specification unit 53 searches the presence or absence of the heat packet whose transport destination has not been determined at this time point and that satisfies the conditions received, with regard to the heat packet being transported in the supply loop 110 or the return loop 120 (Step S802).

Herein, the heat packet existed in the supply loop 110 or the return loop 120 of the present embodiment will be described. When a building that operates in 24 hours belongs to the heat interchange system 100 of the present embodiment, the heat interchange system 100 also operates in 24 hours, but, herein, it is assumed that the operation starts at a time point when the heat interchange system 100 is completely stopped, and the temperature of the heat medium in the supply loop 110 and the return loop 120 is equal to a peripheral temperature.

As described above, in the present embodiment, the temperatures of the heat packet transported in the supply loop 110 are limited in such a manner that a difference between the temperature designated in advance (for example, 5 degrees C.) and the temperature of the heat packet is within 3 degrees C. and the like. Accordingly, when the conditions are satisfied, and the load request is made by other building that belongs to the heat interchange system 100, the heat packet is infused into the supply loop 110. That is, the heat packet, transport destination (consumption destination) of which is not determined, does not exist in the supply loop 110.

In contrast, the return loop 120 has no temperature limitation as that of the supply loop 110, so that there exist the heat medium used in a certain building, wherein part of the heat energy still remains, or the heat medium that are of no utility value on other building (for example, the heat medium whose temperature is equal to the peripheral temperature), besides the heat packets generated in response to the load request from other building that belongs to the heat interchange system 100.

Accordingly, in this case, the heat packet specification unit 53 only needs to carry out the above-mentioned search with respect to the return loop 120.

When the heat packet corresponding to the above-mentioned search exists, the heat packet specification unit 53 specifies the heat packet, as a heat packet that is transported to the building of the request source (Step S802 Yes). It is noted that, regarding the heat packet, as described above, when the transport distance is extended, the temperature mixture area 11 is increased, and the length of the heat packet is shortened. That is, energy loss increases. Also, a time required for transport is increased. Accordingly, regarding the above-mentioned search, the searching range of the heat packet may be limited to one existed within a distance designated in advance (for example, 600 m) positioned on the upstream side from the building of the request source.

In contrast, when the corresponding heat packet does not exist, the heat packet specification unit 53 searches the presence or absence of the heat medium whose transport destination has not been determined at this time point and that satisfies the conditions received, regarding the heat media stored in the buffer tank 506 in each building that belongs to the heat interchange system 100 (Step S802 No, S803). When the corresponding heat medium exists, the heat medium is specified as a heat packet that is transported to the building of the request source (Step S803 Yes). It is noted that, as is the same with the above-mentioned search, regarding this search, the searching range may be limited to buildings existed within a distance designated in advance and positioned on the upstream side from the building of the request source.

In this search, when the corresponding heat packet (heat medium) does not exist, the heat packet specification unit 53 instructs the generation of the heat packet (Step S802 No, S809). The generation of the heat packet is carried out by the heat source determined based on conditions designated in advance by the heat packet specification unit 53. Herein, the conditions designated in advance, for example, mean that the energy efficiency in the region where the heat interchange system 100 is arranged is enhanced to the maximum. More specifically, the heat source wherein its operation has already been made, and the generation of the heat packet is feasible within the high-efficient operation range of the heat source (that is, the generation cost is low) or the heat source wherein the consumption of the primary side energy (electricity, fuel, and the like) required for generating the heat packet is the lowest, is selected. As described above, in the present embodiment, it is configured that the heat sources that belong to the heat interchange system 100 are connected to the control means 5 in such a manner as to be capable of communicating with each other, and that the operational state of each heat source is appropriately informed to the information acquisition unit 52 of the control means 5. It is noted that the heat sources include the multi-step form thermal storage water tank (see FIGS. 4 and 6). Also, when the heat packet is generated under the conditions, the generation of the heat packet is inevitably suppressed in the building disposed at great distance apart from a demand source building, and the heat packet is generated in the building disposed close to the demand source building (transport distance is short).

It is noted that, when the heat packet specification unit 53 determines the generation of the heat packet by the heat source in the request source building of the load request, the heat packet is not generated, and the heat energy is applied to the heat medium by the heat source in the request source building. In this case, the heat packet specification unit 53 notifies the air conditioning control unit 640 of the request source building of the above-mentioned content through the request reception unit 51. That is, the control means 5 decides the use of the heat medium supply path in which the heat medium, to which the heat energy generated by the heat source of the request source building is applied, are supplied in the request source air conditioning area of the request source building.

Figure 9:
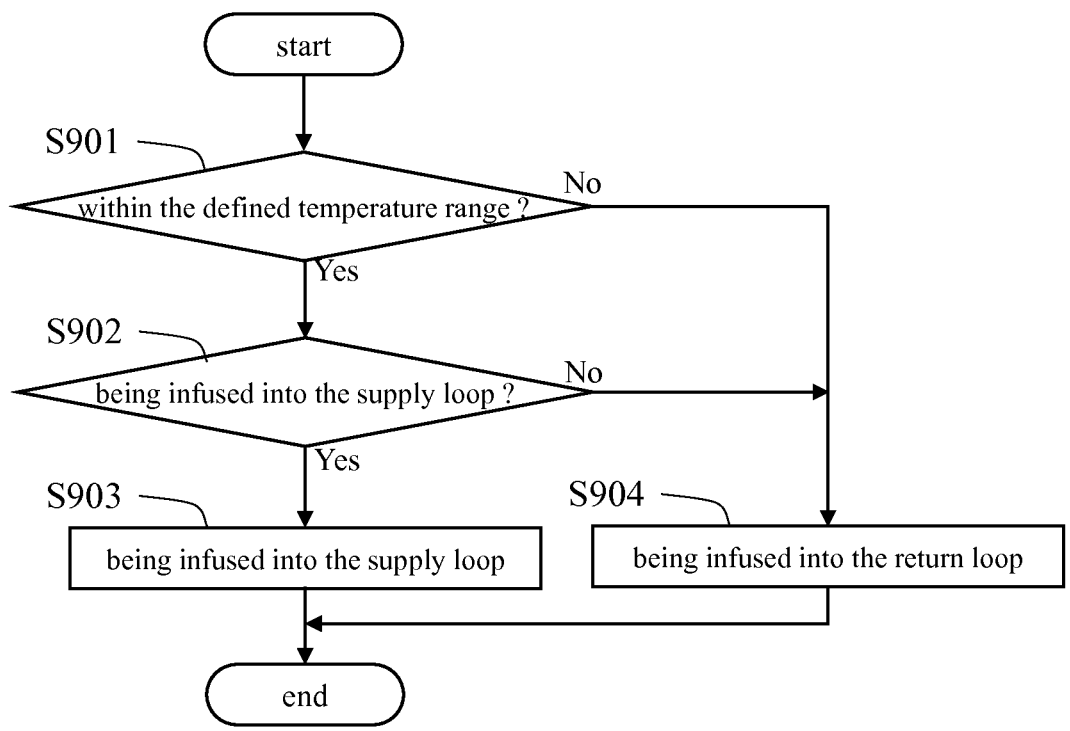
FIG. 9 is a flowchart diagram illustrating one example of a transport path determination procedure executed by the heat interchange system in an embodiment of the present invention.

As described above, the heat packet specification unit 53, which specifies the heat packet transported to the request source, inputs the information on the heat packet specified to the transport method determination unit 54. In response to the input, the transport method determination unit 54 determines the transport path and the transport method of the heat packet specified. FIG. 9 is a flowchart diagram illustrating one example of the transport path determination procedure of the transport method determination unit 54. As described above, in the present embodiment, the temperatures of the heat packets to be transported are limited in the supply loop 110, to the effect that the difference in temperatures is kept within 3 degrees C. Accordingly, the transport method determination unit 54, first, determines whether or not the heat packet specified in the above-mentioned manner belongs to a temperature range of transport of the supply loop 110 (Step S901). When the temperature of the heat packet is within a defined temperature range, and the heat packet can be infused into the supply loop 110, the transport method determination unit 54 determines that the transport path is the supply loop 110 (Step S901 Yes, Step S902 Yes, S903). In contrast, when use reservations for the supply loop 110 between the transport source and the request source (the existence of a multitude of preceding heat packets, and the like) are substantially made, and there are circumstances under which it takes an enormous amount of time until the transport starts, and it is preferable that the heat packet be transported through the return loop 120, the transport method determination unit 54 determines that the transport path is the return loop 120 even when the temperature of the heat packet is within the defined temperature range (Step S901 Yes, Step S902 No, S904).

Also, when the temperature of the heat packet is out of the defined temperature range, the transport method determination unit 54 determines that the transport path is the return loop 120 (Step S901 No, S904).

Figure 10:
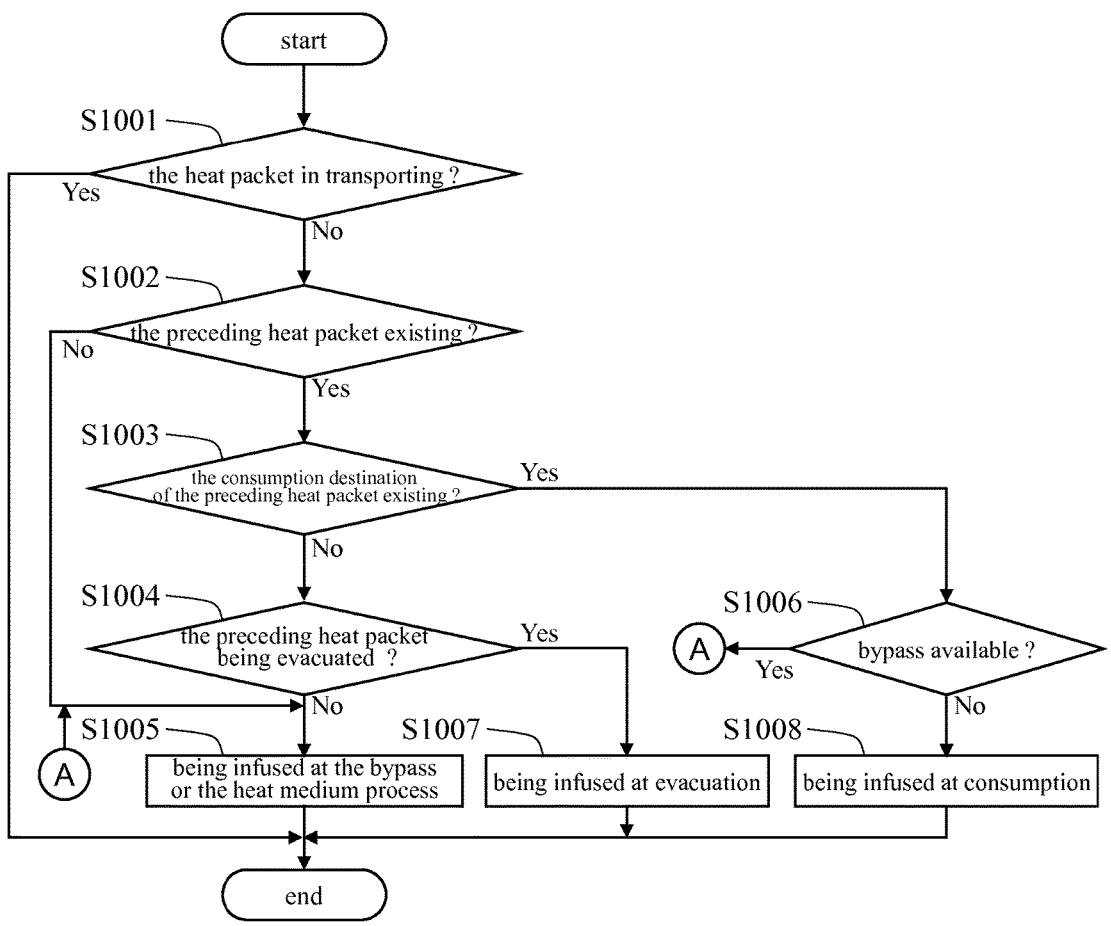
FIG. 10 is a flowchart diagram illustrating one example of a transport method determination procedure executed by the heat interchange system in an embodiment of the present invention.

The transport method determination unit 54, which determines the transport path in the above-mentioned manner, subsequently determines the transport method of the heat packet. Herein, the transport method, as described above, means the method of maintaining the balance of the heat media constant at least in a specific section of the heat medium transport path (the supply loop 110 or the return loop 120). FIG. 10 is a flowchart diagram illustrating one example of the transport method determination procedure of the transport method determination unit 54.

First, the transport method determination unit 54 confirms whether or not the heat packet specified is a heat packet being transported (Step S1001). When the heat packet specified is a heat packet being transported, it is not necessary to infuse the heat packet into the supply loop 110 or the return loop 120, and the procedure is finished (Step S1001 Yes).

When the heat packet specified is not a heat packet being transported, the transport method determination unit 54 confirms whether or not a preceding heat packet exists in the transport path determined, leading up to the request source building (Step S1002). When the preceding heat packet exists, the transport method determination unit 54 confirms whether or not the consumption destination of the preceding heat packet existed in the transport path determined by the above-mentioned method is determined, between a building (hereinafter referred to as a transport source building) including the buffer tank 506 that stores the heat medium specified by the heat packet specification unit 53 or the heat source generating the heat packet specified by the heat packet specification unit 53, and the request source building (Step S1002 Yes, S1003). When the consumption destination of the preceding heat packet is determined, the transport method determination unit 54 confirms whether or not unnecessary heat medium whose length is longer than the length of the heat packet specified by the heat packet specification unit 53 exists in front (on the downstream side) of the preceding heat packet (Step S1003 Yes, S1006). When the corresponding unnecessary heat medium does not exist, the transport method determination unit 54 determines that the heat packet is infused at the time of consumption of the preceding heat packet (Step S1006 No, S1008). As described above, the consumption destinations of all the heat packets transported in the supply loop 110 are basically determined. Accordingly, when the transport path is the supply loop 110, and the preceding heat packets are in a state of being lined, the heat packet specified by the heat packet specification unit 53 is infused into the supply loop 110 at the time of consumption of the preceding heat packets.

In contrast, when the consumption destination of the preceding heat packet is not determined (that is, when the transport path is the return loop 120), the transport method determination unit 54 confirms whether or not the preceding heat packet can be evacuated to the buffer tank 506 in the building or a multi-step form thermal storage water tank 105, which are existed in the transport path determined by the above-mentioned method, between the transport source building and the request source building (Step S1003 No, S1004). When the preceding heat packet can be evacuated, the transport method determination unit 54 determines that the heat packet is infused at the time of evacuation of the preceding heat packet (step S1004 Yes, S1007). It is noted that the evacuation feasibility to the buffer tank 506 means that the capacity of storing the preceding heat packet in the buffer tank 506 exists, and that when the preceding heat packet is introduced and evacuated into the buffer tank 506, a heavy heat loss exceeding a threshold value designated in advance does not occur by virtue of the mixture with the heat medium that have already existed in the buffer tank 506 (that is, the loss is allowable), and the length of the preceding heat packet is longer than the length of the heat packet specified by the heat packet specification unit 53.

When the preceding heat packet cannot be evacuated, the transport method determination unit 54 determines that the preceding heat packet is bypassed from one heat medium transport path to the other heat medium transport path, with regard to the connection portion 130 of the request source building or the connection portion 130 in the building existed in the transport path determined by the above-mentioned method, between the transport source building and the request source building, and that the heat packet is infused at the time of bypassing the preceding heat packet (Step S1004 No, S1005). The same is similarly applied to a case where the preceding heat packet does not exist (Step S1002 No, S1005). However, in this case, there is a possibility that the preceding heat medium is not the heat packet but unnecessary heat medium having a temperature equal to the peripheral temperature. Accordingly, in this case, in place of the bypass, it is possible to determine that the heat packet is infused when the preceding heat medium is introduced to the buffer tank 506 or the multi-step form thermal storage water tank 105 in any building (hereinafter, referred to as at a heat medium process) as the heat medium to which the heat energy is applied. The same is similarly applied to a case where the unnecessary heat medium, whose length is longer than the length of the heat packet specified by the heat packet specification unit 53, exists in front of the preceding heat packet (Step S1006 Yes, S1005).

It is noted that when the preceding heat packet and the unnecessary heat medium exist, it is exceedingly preferable that the heat medium, which is targeted for the bypass or the heat medium process, be the heat medium existed in front of the preceding heat packet. In this manner, the heat packet specified by the heat packet specification unit 53 can be infused without stopping the advance of the preceding heat packet.

Also, in any cases, an infusion speed at which the heat medium is infused in the delivery path determined as the transport path is equal to an extraction speed at which the heat medium is extracted from the delivery path. That is, the infusion amount and the extraction amount are equal. That is, in a case where the infusion of the heat medium is carried out with respect to the delivery path in other building, which is only aimed at advancing the preceding heat packet, the infusion of the heat medium in the other building is stopped when the heat packet specified by the heat packet specification unit 53 is infused.

As described above, the transport method determination unit 54, which determines the transport path and the transport method for the heat packet specified, notifies the operation control unit 55 of the transport method determined. The operation control unit 55, which receives the notification, carries out the transport of the heat packet specified by the heat packet specification unit 53 based on the transport path and the transport method that are determined by the transport method determination unit 54 (Step S805). Then, waiting is made until the heat packet arrives at the request source building (Step S806 No). It is noted that the transport of the heat packet is realized by controlling the operations (the operations of the open-and-close valve and the pump) of the connection portion 130 (connection portions 131 to 135 in FIG. 5) in the building that belongs to the heat interchange system 100.

Subsequently, when the heat packet arrives at the request source building, the thermal router 530 of the request source building introduces the heat packet arrived to the buffer tank 506 of the request source building (Step S807). The introduction timing is instructed by the operation control unit 55. As described above, the temperature distribution in the supply loop 110 and the return loop 120 is retained in the information acquisition unit 52 in real time, so that the arrival timing of the heat packet can be detected. It is noted that the introduction of the heat packet to the buffer tank 506 is described later.

Figure 11:
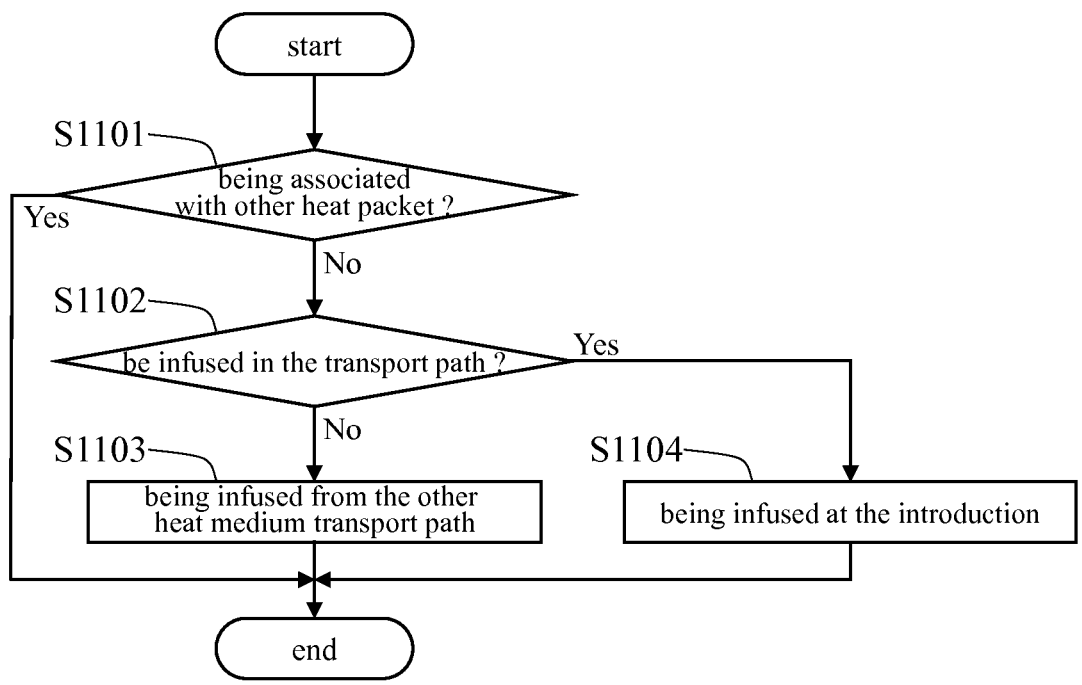
FIG. 11 is a flowchart diagram illustrating one example of an infusion method determination procedure executed by the heat interchange system in an embodiment of the present invention.

Also, when the heat packet is introduced to the buffer tank 506, it is necessary to infuse the same amount of heat medium to the heat medium transport path (the supply loop 110 or the return loop 120) from which the heat packet is taken out, in order to maintain the balance of the heat media constant. The method of infusing the heat medium is also determined by the above-mentioned transport method determination unit 54. FIG. 11 is a flowchart diagram illustrating one example of an infusion method determination procedure carried out by the transport method determination unit 54. The procedure is carried out before the heat packet arrives at the request source building.

First, the transport method determination unit 54 confirms whether or not the heat packet introduced in the buffer tank 506 is associated with other heat packet (Step S1101). Herein, association means a state where the heat packet is associated with subsequent heat packet as the preceding heat packet whose consumption destination is determined at Step S1002 in FIG. 10. When the heat packet is associated, the procedure is finished (Step S1101 Yes). In this case, when the heat packet is introduced in the buffer tank 506 of the request source building, the heat packet being associated is infused, so that the balance of the heat media is maintained constant in heat medium transport path.

When the subsequent heat packet being associated does not exist, the transport method determination unit 54 confirms whether or not the heat packet can be infused from the buffer tank 506 in the building or the multi-step form thermal storage water tank 105, which are existed in the transport path determined by the above-mentioned method, between the transport source building and the request source building (Step S1101 Yes, S1102). In a case where the heat packet can be infused from the buffer tank 506 in the building existed in the transport path, when the heat packet is introduced in the buffer tank 506 in the request source building, the transport method determination unit 54 determines that the heat packet is infused from the buffer tank 506 in the building existed in the transport path (Step S1102 Yes, S1104). It is noted that the capability of infusing the heat packet from the buffer tank 506 means that there exists the same amount of heat medium as that of the preceding heat packet taken out from the buffer tank 506, furthermore, and that when an infusion destination is the supply loop 110, the heat medium is within the above-mentioned defined temperature.

In a case where the heat packet cannot be infused from the buffer tank 506 in the building existed in the transport path, when the heat packet is introduced in the buffer tank 506 in the request source building, the transport method determination unit 54 determines that the heat packet is infused from the other heat medium transport path (Step S1102 No, S1103). Herein, the infusion from the other heat medium transport path is realized by bypassing the heat medium from one heat medium transport path to the other heat medium transport path. It is noted that, in this case, there is a case where the bypass of the heat medium, which does not satisfy the temperature range, from the return loop 120 to the supply loop 110 is unavoidably carried out. The bypass is carried out in a section where the heat packet does not exist in the supply loop 110.

The balance of the heat media can be maintained constant in heat medium transport path by carrying out the infusion method determined in the above-mentioned manner, when the heat packet is introduced in the buffer tank 506.

As described above, when the heat packet (heat medium) is introduced in the buffer tank 506 of the request source, the air conditioning control unit 640 of the request source building takes out the heat energy applied to the heat medium via the heat exchanger 520 and supplies the heat energy to the indoor instrument of the request source (Step S808). It is noted that the heat medium that is utilized in the building inclusive of the indoor instrument of the request source and has the heat energy consumed (herein, the heat medium whose temperature increases) is discharged into the return loop 120 at an appropriate timing. Also, thus, the heat medium that does not include the usable heat energy in other buildings as described above, is appropriately introduced into the buffer tank 506 in the building that belongs to the heat interchange system 100 or the multi-step form thermal storage water tank 105, as the heat medium to which the heat energy is applied.

Hereinafter, the operation of the thermal router 530 and the thermal packet storage 540 will be sequentially described. It is noted that, in FIGS. 12 to 17 descried below, paths through which the heat medium pass are illustrated in thick lines, and other paths are illustrated in thin lines. Also, the open-and-close valves being in an open state are illustrated in a black paint, and the open-and-close valves being in a closed state are illustrated by a line diagram.

Figure 12:
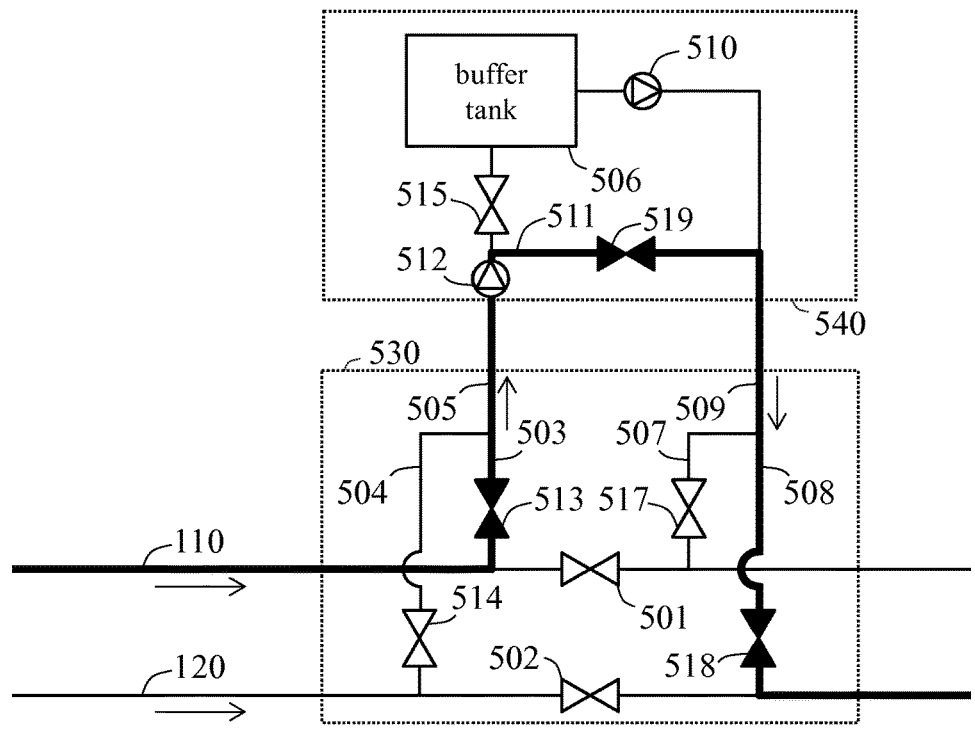
FIG. 12 is a diagram to describe the operation of the heat interchange system in an embodiment of the present invention.
Figure 13:
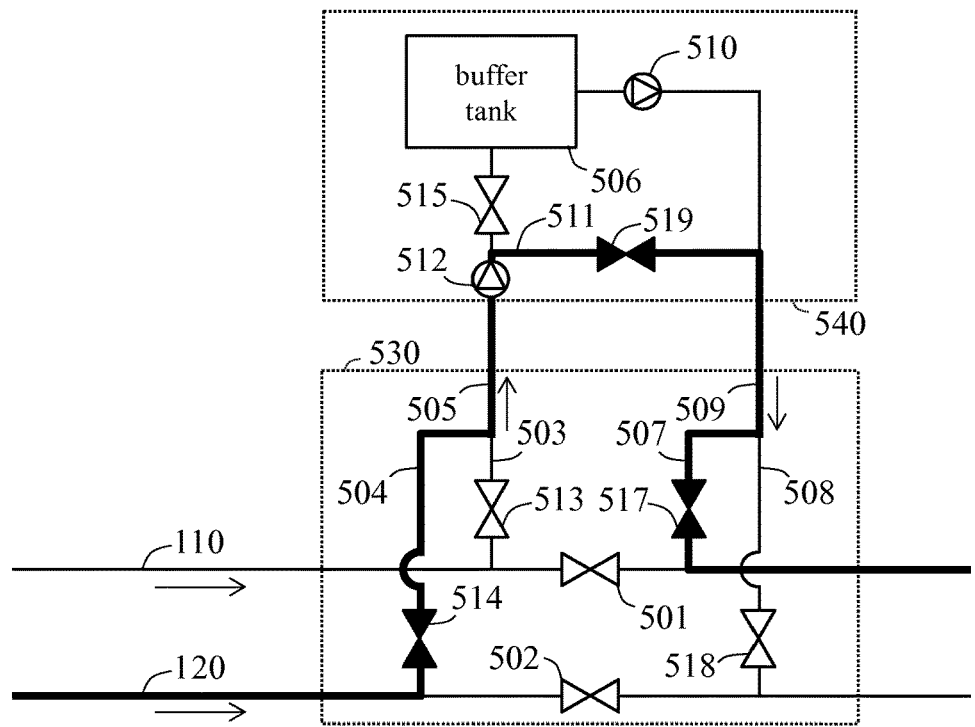
FIG. 13 is a diagram to describe the operation of the heat interchange system in an embodiment of the present invention.

First, the bypassing operation from one heat medium transport path to the other heat medium transport path will be described. FIGS. 12 and 13 are diagrams to describe the bypassing operation of the thermal router 530 and the thermal packet storage 540. FIG. 12 corresponds to the bypass from the supply loop 110 to the return loop 120, and FIG. 13 corresponds to the bypass from the return loop 120 to the supply loop 110.

As illustrated in FIG. 12, the bypass from the supply loop 110 to the return loop 120 can be realized by bringing the open-and-close valves 501 and 502 into a closed state and the open-and-close valves 513, 519, and 518 into an open state (other open-and-close valves are brought into a closed state). Also, as illustrated in FIG. 13, the bypass from the return loop 120 to the supply loop 110 can be realized by bringing the open-and-close valves 501 and 502 into a closed state and the open-and-close valves 514, 519, and 517 into an open state (other open-and-close valves are brought into a closed state). It is noted that the transport of the heat media in these bypass states can be realized by the drive of the pump 512.

Figure 14:
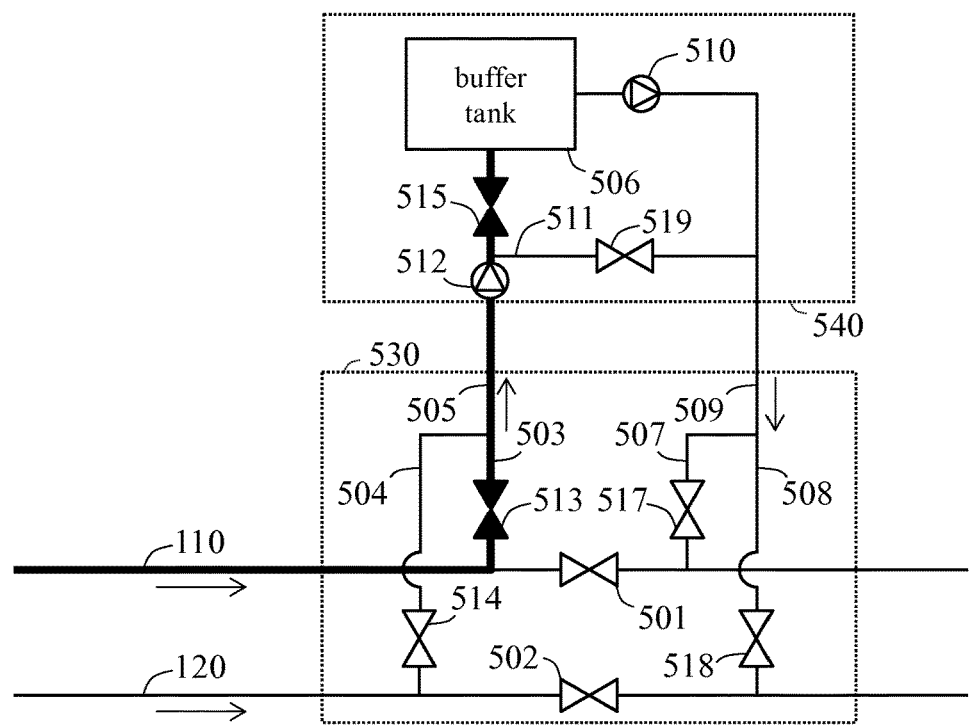
FIG. 14 is a diagram to describe the operation of the heat interchange system in an embodiment of the present invention.

FIG. 14 is a diagram to describe the introduction operation of the heat packet from the supply loop 110 to the buffer tank 506 by means of the thermal router 530 and the thermal packet storage 540. As illustrated in FIG. 14, the introduction of the heat packet from the supply loop 110 to the buffer tank 506 can be realized by bringing the open-and-close valve 501 into a closed state and the open-and-close valves 513 and 515 into an open state (other open-and-close valves are brought into a closed state). It is noted that the transport of the heat media in the state can be realized by the drive of the pump 512.

Figure 15:
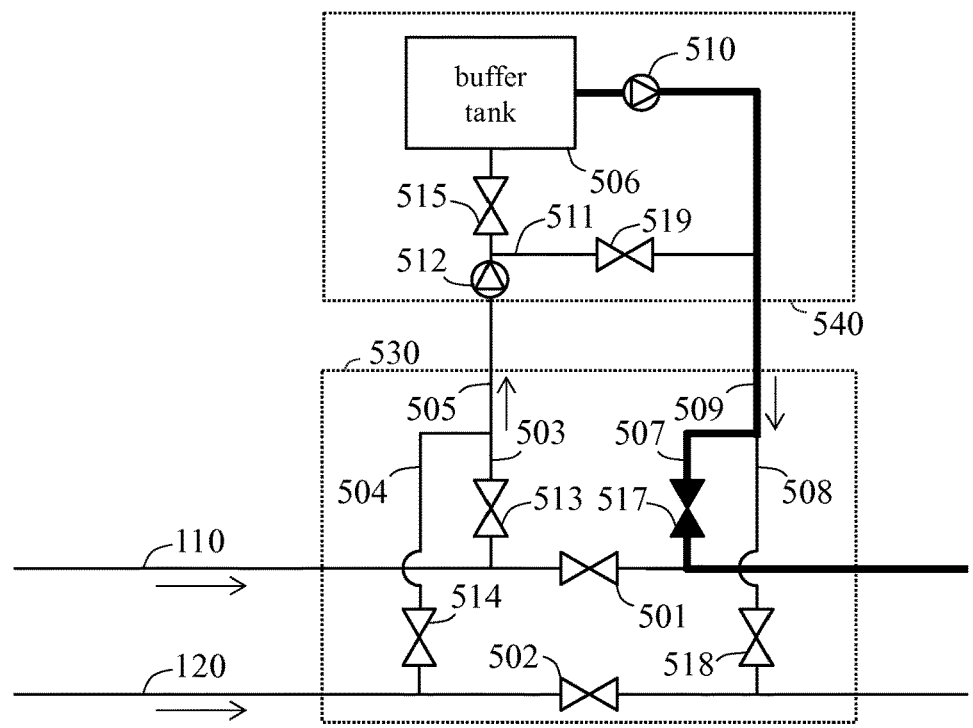
FIG. 15 is a diagram to describe the operation of the heat interchange system in an embodiment of the present invention.

FIG. 15 is a diagram to describe the delivery operation of the heat packet from the buffer tank 506 to the supply loop 110 by means of the thermal router 530 and the thermal packet storage 540. As illustrated in FIG. 15, the delivery of the heat packet from the buffer tank 506 to the supply loop 110 can be realized by bringing the open-and-close valve 501 into a closed state and the open-and-close valve 517 into an open state (other open-and-close valves are brought into a closed state). It is noted that the transport of the heat media in the state can be realized by the drive of the pump 510.

Figure 16:
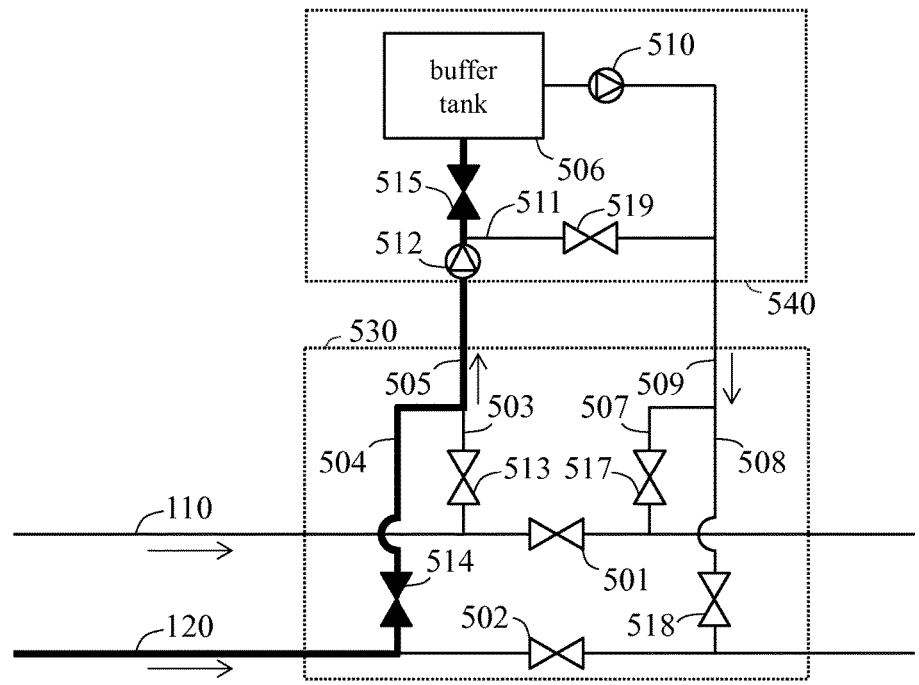
FIG. 16 is a diagram to describe the operation of the heat interchange system in an embodiment of the present invention.

FIG. 16 is a diagram to describe the introduction operation of the heat packet from the return loop 120 to the buffer tank 506 by means of the thermal router 530 and the thermal packet storage 540. As illustrated in FIG. 16, the introduction of the heat packet from the return loop 120 to the buffer tank 506 can be realized by bringing the open-and-close valve 502 into a closed state and the open-and-close valves 514 and 515 into an open state (other open-and-close valves are brought into a closed state). It is noted that the transport of the heat medium in the state can be realized by the drive of the pump 512.

Figure 17:
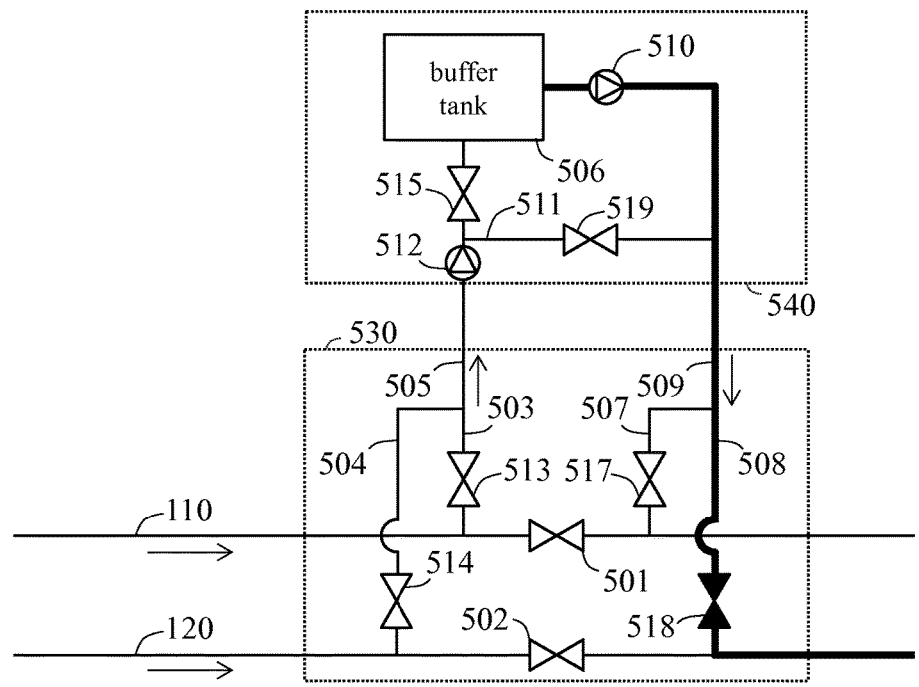
FIG. 17 is a diagram to describe the operation of the heat interchange system in an embodiment of the present invention.

FIG. 17 is a diagram to describe the delivery operation of the heat packet from the buffer tank 506 to the return loop 120 by means of the thermal router 530 and the thermal packet storage 540. As illustrated in FIG. 17, the delivery of the heat packet from the buffer tank 506 to the return loop 120 can be realized by bringing the open-and-close valve 502 into a closed state and the open-and-close valve 518 into an open state (other open-and-close valves are brought into a closed state). It is noted that the transport of the heat media in the state can be realized by the drive of the pump 510.

It is noted that, in the above-mentioned present embodiment, the transport directions of the heat media in the supply loop 110 and the return loop 120 are identical, but in view of reduction in transport time, it is preferable that the transport directions of the heat media in the supply loop 110 and the return loop 120 be opposite to each other.

Figure 18:
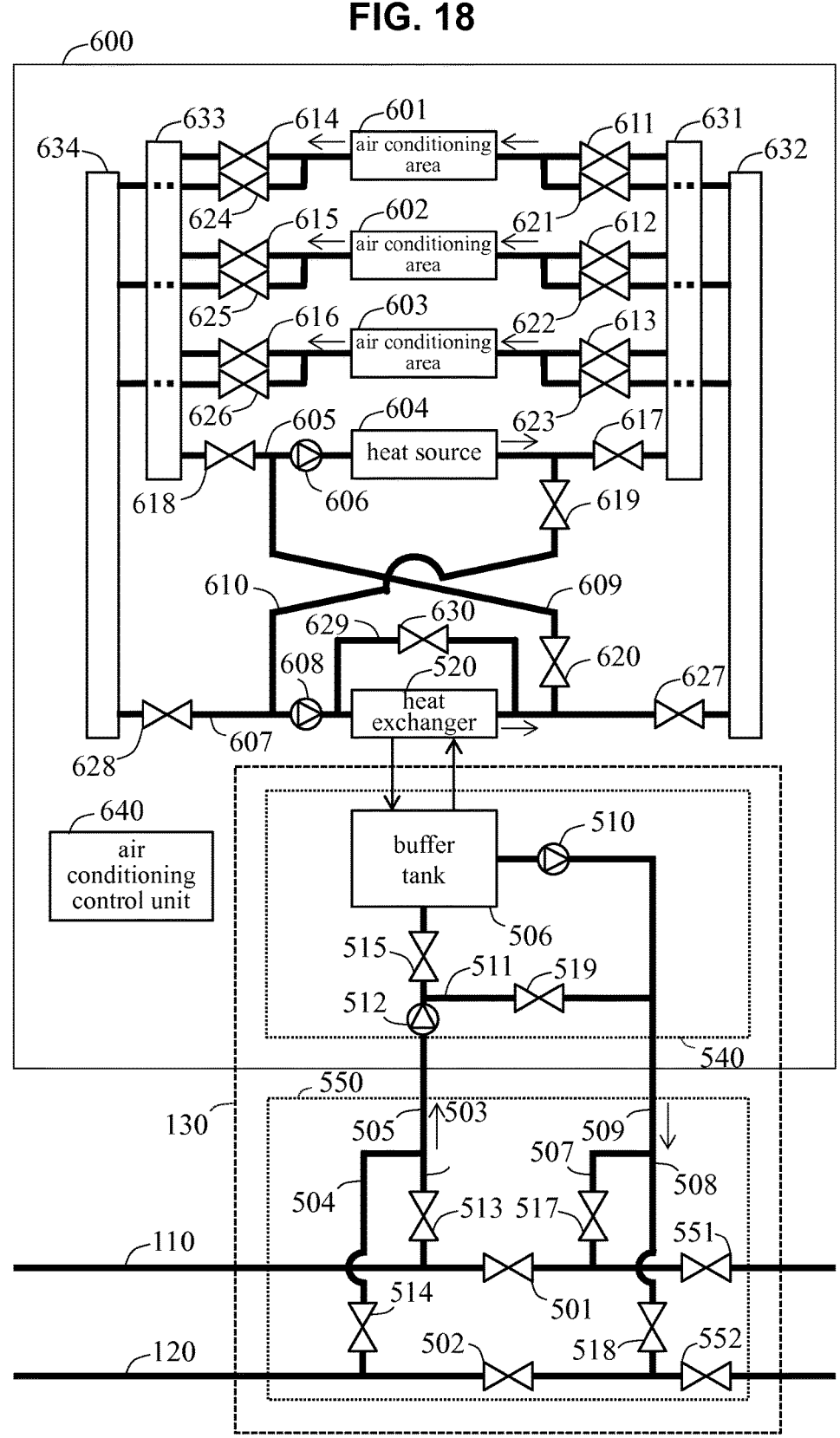
FIG. 18 is a schematic configuration diagram illustrating other thermal router in an embodiment of the present invention.

Also, it may be configured such that the transport directions of the heat media can be arbitrarily switched. FIG. 18 is a diagram illustrating one example of the constitution of a thermal router that can switch the above-mentioned transport directions. As illustrated in FIG. 18, a thermal router 550 is different from the thermal router 530 illustrated in FIG. 5 in that the thermal router 550 includes an open-and-close valve 551 and an open-and-close valve 552, and the other constitution is identical. The open-and-close valve 551 is interposed in the supply loop 110, and a connection point between the supply loop side lead-out path 507 and the supply loop 110 is sandwiched between the open-and-close valve 501 and the open-and-close valve 551. The open-and-close valve 552 is interposed in the return loop 120, and a connection point between the return loop side lead-out path 508 and the return loop 120 is sandwiched between the open-and-close valve 502 and the open-and-close valve 552.

With this constitution in a race where the heat medium is infused into the supply loop 110 through the supply loop side lead-out path 507, when the open-and-close valve 501 is placed in a closed state, and the open-and-close valve 551 is placed in an open state, the heat medium infused advance in the direction from the connection point between the supply loop side lead-out path 507 and the supply loop 110 to the open-and-close valve 551. In contrast, when the open-and-close valve 501 is placed in an open state, and the open-and-close valve 551 is placed in a closed state, the heat medium infused advance in the direction from the connection point between the supply loop side lead-out path 507 and the supply loop 110 to the open-and-close valve 501. Similarly, in a case where the heat medium is infused into the return loop 120 via the return loop side lead-out path 508, when the open-and-close valve 502 is placed in a closed state, and the open-and-close valve 552 is placed in an open state, the heat medium infused advance in the direction from the connection point between the return loop side lead-out path 508 and the return loop 120 to the open-and-close valve 552. In contrast, when the open-and-close valve 502 is placed in an open state, and the open-and-close valve 552 is placed in a closed state, the heat medium infused advance in the direction from the connection point between the return loop side lead-out path 508 and the return loop 120 to the open-and-close valve 502.

With this constitution, it is possible to simultaneously transport a plurality of heat packets whose transport directions are different in the single heat medium transport path. That is, regarding the constitution illustrated in FIG. 4, for example, when the heat packet is transported from the heat source 101 to the heat load 102 through the return loop 120, it is simultaneously possible to transport the heat packet from the heat source 105 to the heat load 104 through the return loop 120. It is noted that, even for the constitution of the thermal router 110 illustrated in FIG. 5, it is possible to simultaneously transport a plurality of heat packets whose transport directions are identical in the single heat medium transport path. That is, regarding the constitution illustrated in FIG. 4, for example, when the heat packet is transported from the heat source 101 to the heat load 102 through the return loop 120, it is simultaneously possible to transport the heat packet from the heat source 103 to the heat load 104 through the return loop 120.

As described above, according to the heat interchange system 100 of the present embodiment, it is possible to arbitrarily transfer the heat energy between the buildings connected to the system, which makes it possible to operate the heat sources, each of which is included in each building, in cooperation with each other. Accordingly, the heat sources, which are conventionally independent from each other and included in respective buildings, sufficiently generate the heat energy in such a manner as not to be short of the heat energy in respective buildings, so that the heat energy excessively generated in the region as a whole can be reduced to an amount originally required, which includes an appropriate surplus in the region as a whole. For example, the recycle of the heat energy of the heat medium used in the building (heat load) and introduced into the return loop 120 is feasible, and the small amount of heat energy, which has been conventionally discarded, and waste heat can be effectively utilized. Also, as a result, a difference in the temperatures of the heat media before and after the application of the heat energy by the heat source can be increased, which makes it possible to operate the heat source at a high efficiency. In addition, various sources, such as the heat source in which gas is used as the primary side energy and the heat source in which electricity is used as the primary side energy, can be operated at a high efficiency based on seasons (heating and cooling) or time zone in accordance with respective characteristics. Then, these effects are combined, and the primary side energy consumed by the heat sources can be exceedingly reduced.

Also, regarding the heat interchange system 100 of the present embodiment, the buildings can be arbitrarily connected to the supply loop 110 and the return loop 120 via the connection portion 130. Accordingly, it is not necessary to replace or renew the heat sources included in the existing building, and the heat interchange system 100 is easily applied in the region where many existing buildings exist. Additionally, heat energy suppliers and heat energy users are easily identified, so that charge can be relatively easily carried out.

Also, regarding the heat interchange system 100 of the present embodiment, the heat media are transported in the supply loop 110 and the return loop 120 by means of the pump included in each building, so that it is not necessary to interpose the pump that transports the heat media (circulates in the loop), as illustrated in FIG. 4, in the supply loop 110 and the return loop 120. That is, the pump is driven based on a limited place and a limited period required for transport of the heat media, so that the energy consumption for the heat medium transport can be reduced to the minimum requirements. Additionally, this constitution only requires the pump that infuses the heat medium into the supply loop 110 or the return loop 120 and the pump that extracts the heat medium from the supply loop 110 or the return loop 120 in response to the above-mentioned pump, to operate in a state of being at the same flow rate. In this time, there is no limitation on the flow rate of the heat media flowing through the supply loop 110 or the return loop 120. That is, when one flow rate of the pumps operated as a pair is adjustable, the capacity of the pumps installed in each building is arbitrary. Accordingly, for example, inconveniences such as the requirement for the installation of a pump having large capacity irrespective of a small-scale building, are obviated.

It is noted that the constitution in which a building includes one buffer tank 506 has been described above, but it is possible to adopt constitution in which a plurality of buffer tanks are provided in one building, and respective buffer tanks can store the heat media whose temperatures are different from each other. In this case, the heat exchanger is provided in each buffer tank, and as is the same with the above-mentioned heat exchanger 520, each heat exchanger is connected to each air conditioning area via the header. That is, with this constitution, the heat medium, to which the heat energy is applied by the heat source and each heat exchanger, can be selectively supplied to each air conditioning area.

As described above, the constitution in which the heat medium is directly flown from the supply loop 110 or the return loop 120 into the buffer tank has been described. This constitution is simple in structure, which can be relatively easily realized. However, the degree of freedom of the arrangement of the buffer tank is relatively small, because the buffer tanks need to be arranged at the same height in each building, and the water heads need to be equalized.

Hereinafter, the constitution, in which the degree of freedom of the arrangement of the buffer tank can be enhanced, will be described.

Figure 19:
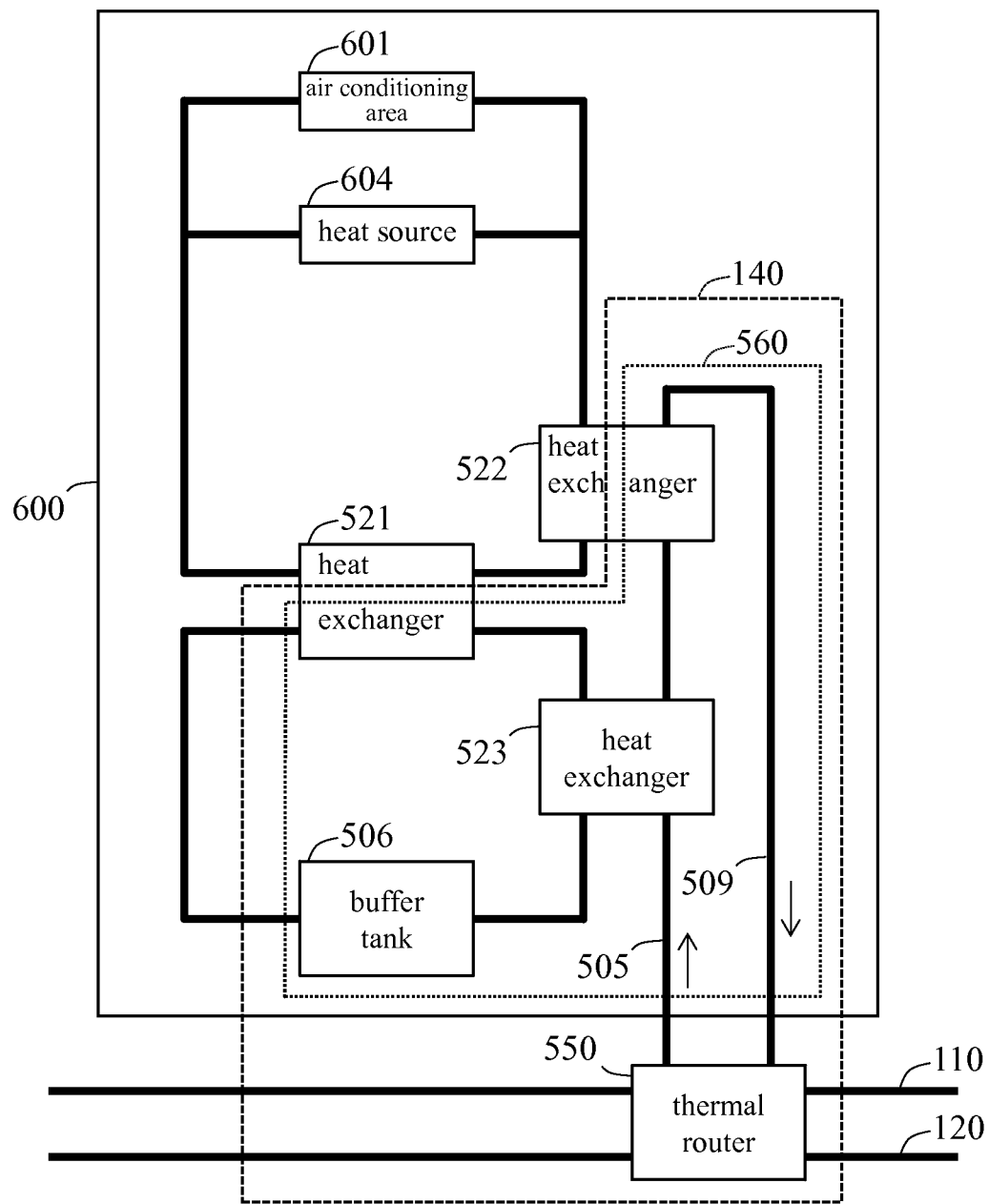
FIG. 19 is a schematic diagram illustrating the example of other thermal packet storage in an embodiment of the present invention.

FIG. 19 is a schematic diagram illustrating other example of the connection portion in an embodiment of the present invention. As is the same with FIG. 5, herein, a connection portion 140 is representatively illustrated for the connection portions 131 to 134. In FIG. 19, the heat source (refrigerator) 604 and the heat load (air conditioning area inclusive of an air conditioner) 601 in the interior of the building connected to the supply loop 110 and the return loop 120 by means of the connection portion 140 are represented. Also, FIG. 19 is aimed at illustrating the outline of the transfer of the heat energy of the connection portion 140, and the description of the open-and-close valves, pumps, and the like is omitted. It is noted that the constitution of the building illustrated in FIG. 19 can be equally applied to the building A that includes the heat source 101, the building B that includes the heat load 102, the building C that includes the heat source 103, and the building D that includes the heat load 104. However, the heat sources 101 and 103 only need to include at least the heat sources illustrated in FIG. 19, and the heat loads 102 and 103 only need to include at least the heat loads (air conditioner) illustrated in FIG. 19.

As illustrated in FIG. 19, the connection portion 140 includes the thermal router 550 interposed in the supply loop 110 and the return loop 120. It is noted that, in this example, although the thermal router 550 illustrated in FIG. 18 is used, the thermal router 530 illustrated in FIG. 5 can be used.

The heat medium extracted from the supply loop 110 or the return loop 120 via the thermal router 550 is sequentially introduced to a heat exchanger 523 and a heat exchanger 522 through the common introduction path 505, and returned to the thermal router 550 through the common lead-out path 509.

The heat exchanger 523 realizes the heat exchange between the heat medium extracted by the thermal router 550 (hereinafter, appropriately, referred to as transportation heat medium) and intermediate heat medium flowing through a flow path inclusive of the buffer tank 506. Also, the heat exchanger 522 realizes the heat exchange between the transportation heat medium and heat medium that flows through the flow path inclusive of the heat source 604 and the air conditioning area 601 and that is used for air conditioning (hereinafter, appropriately, referred to as air-conditioning heat medium). Also, the heat exchange between the intermediate heat medium and the air-conditioning heat medium can be realized by a heat exchanger 521. It is noted that, for example, water can be used for the intermediate heat medium.

With this constitution, the heat medium extracted by the thermal router 550 is not directly accumulated in the buffer tank 506 and separated from the buffer tank 506. Accordingly, the water head of the buffer tank 506 particularly does not influence the heat media transported in the supply loop 110 or the return loop 120. Consequently, it is possible to arrange the buffer tank 506 at an arbitrary position in the building.

It is noted that, regarding the constitution illustrated in FIG. 19, the heat energy included in the intermediate heat medium accumulated in the buffer tank 506 is transferred to the air-conditioning heat medium in the heat exchanger 521, so that the heat energy can be used in the air conditioner in the air conditioning area 601 and the like. Also, the heat energy of the air-conditioning heat medium to which the heat energy generated by the heat source 604 is applied, or the heat energy of the air-conditioning heat medium that include heat energy that is not consumed and remained in the air conditioning area 601, can be transferred to the intermediate heat medium in the heat exchanger 521. Then, the heat energy is transferred to the transportation heat medium in the heat exchanger 523, thereby transporting the heat energy to other buildings.

Also, regarding the heat energy demand and supply, when a time lag between a surplus generation timing and a demand generation timing does not exist, the heat energy between the transportation heat medium and the air-conditioning heat medium can be given and received through the use of the heat exchanger 522 without transferring the heat energy to the intermediate heat medium. That is, the heat energy included in the transportation heat medium is transferred to the air-conditioning heat medium in the heat exchanger 522, so that the heat energy can be used in the air conditioner of the air conditioning area 601 and the like. Also, surplus (or remaining) heat energy included in the air-conditioning heat medium is transferred to the transportation heat medium in the heat exchanger 522, so that the heat energy can be transported to other buildings.

Also, regarding the constitution illustrated in FIG. 19, when the heat medium is extracted by the thermal router 550 into the common introduction path 505, the same amount of heat medium is pushed out by the thermal router 550 through the common lead-out path 509. Accordingly, in the thermal router 550, when the heat medium is extracted from one of the supply loop 110 and the return loop 120, and the heat medium is infused into the same heat medium transport path, there is no change in the amount of heat media in the heat medium transport path. Accordingly, it is not necessary to infuse the same amount of heat medium as the amount of heat medium extracted into the heat medium transport path, which is a target for infusion, concurrently with the extraction of the heat medium on the upstream side of the extraction position. Also, it is not necessary to extract the same amount of heat medium as the amount of heat medium infused from the heat medium transport path, which is a target for infusion, concurrently with the infusion of the heat medium on the downstream side of the infusion position. That is, the procedure of processing the extraction and infusion of the heat medium from the supply loop 110 or the return loop 120 is simplified with great facility. It is noted that other procedures are similar to those illustrated in FIGS. 8 to 11. Also, the heat medium is extracted from one of the supply loop 110 and the return loop 120, and the heat medium is infused into the other heat medium transport path, needless to say, it is necessary to adjust the balance of the heat media in each heat medium transport path.

Figure 20:
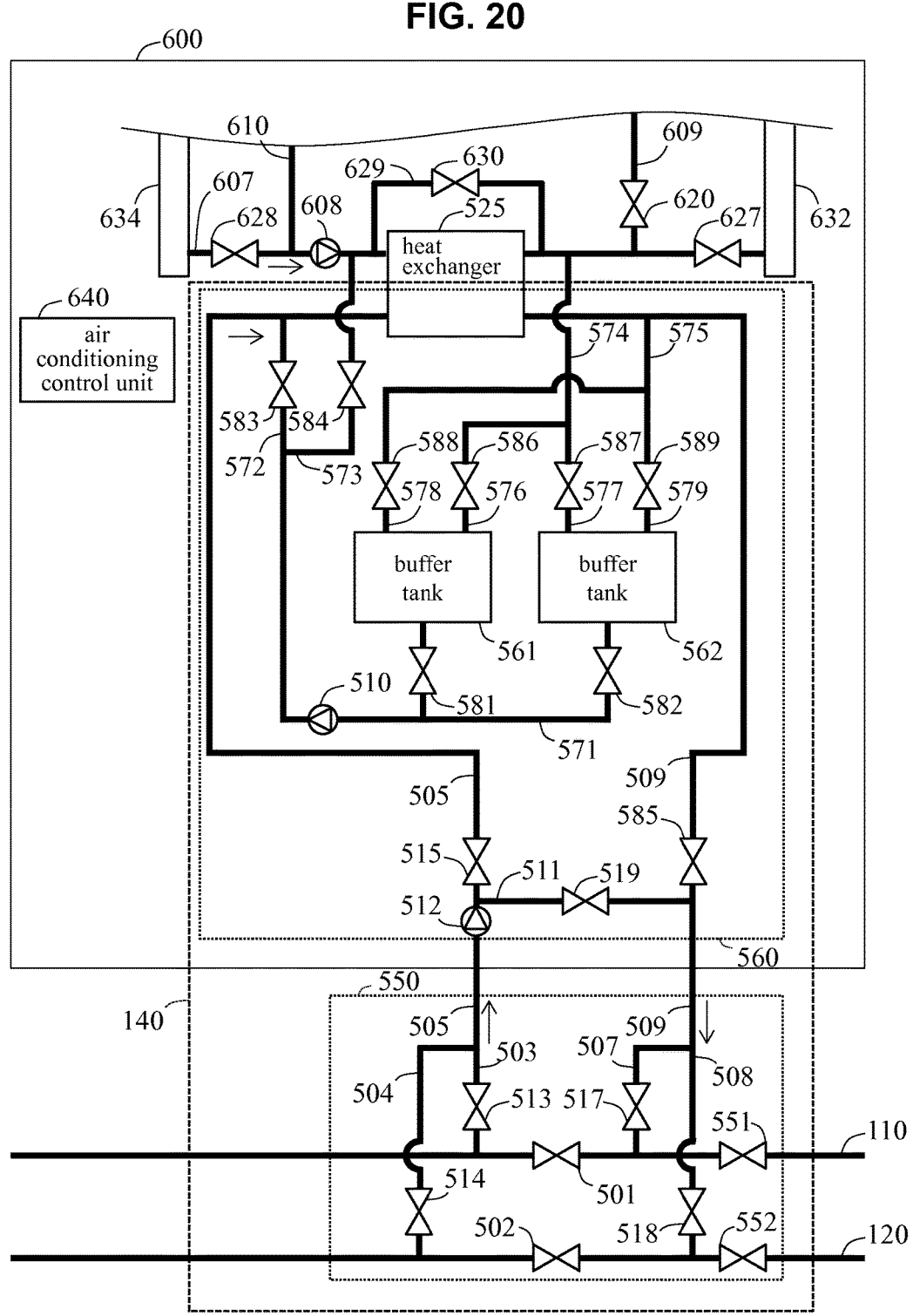
FIG. 20 is a schematic configuration diagram illustrating other thermal packet storage in an embodiment of the present invention.

FIG. 20 is a schematic configuration diagram, in which the constitution of the connection portion 140 illustrated in FIG. 19 is specified. Although not limited, herein, the functions of the heat exchangers 521, 522, and 523 illustrated in FIG. 19 are standardized, thereby realizing one heat exchanger 525. Also, as the buffer tank 506, a plurality of buffer tanks is adopted. Although not limited, herein, two open-type buffer tanks 561 and 562 are arranged. Furthermore, the constitution on the side of the heat source and the air conditioning area with respect to the heat exchanger 525 is similar to the constitution described in FIGS. 5 and 18. Hereinafter, the constitution of a thermal packet storage 560 will be specifically described in detail.

As descried above, the thermal router 550 has the constitution described in FIGS. 5 and 18. Then, the other end of the common introduction path 505 connected to the supply loop side introduction path 503 and the return loop side introduction path 504 is connected to the heat exchanger 525. Also, the other end of the common lead-out path 509 connected to the supply loop side lead-out path 507 and the return loop side lead-out path 508 is connected to the output end, corresponding to the common introduction path 505, of the heat exchanger 525.

The open-and-close valve 515 is interposed in the common introduction path 505, and an open-and-close valve 585 is interposed in the common lead-out path 509. The pump 512 that delivers the heat medium to the side of the open-and-close valve 515 is provided on the upstream side of the open-and-close valve 515 interposed by the common introduction path 505. Also, the common introduction path 505, between the open-and-close valve 515 and the pump 512, and the common lead-out path 509 on the downstream side of the open-and-close valve 585 are connected by the bypass flow path 511, and the open-and-close valve 519 is interposed in the bypass flow path 511.

Regarding the common lead-out path 509, a transport-side buffer tank introduction path 575 is connected between the heat exchanger 525 and the open-and-close valve 585. The other end of the transport-side buffer tank introduction path 575 diverges into a first side introduction path 578 and a second side introduction path 579, and the first side introduction path 578 and the second side introduction path 579 are respectively connected to a first buffer tank 561 and a second buffer tank 562.

Also, in the heat medium introduction path that connects the heat exchanger 525 with the second header 632, a building-side buffer tank introduction path 574 is connected between the heat exchanger 525 and the open-and-close valve 627. The other end of the building-side buffer tank introduction path 574 diverges into a first side introduction path 576 and a second side introduction path 577, and the first side introduction path 576 and the second side introduction path 577 are respectively connected to the first buffer tank 561 and the second buffer tank 562.

On the other hand, regarding the common introduction path 505, a transport-side buffer tank lead-out path 572 is connected between the heat exchanger 525 and the open-and-close valve 515. Also, in the common lead-out path 607 that connects the fourth header 634 with the heat exchanger 525, a building-side buffer tank lead-out path 573 is connected between the heat exchanger 525 and the pump 608. The other ends of the transport-side buffer tank lead-out path 572 and the building-side buffer tank lead-out path 573 are connected to a buffer tank common lead-out path 571. The buffer tank common lead-out path 571 is connected to respective buffer tanks 561 and 562 via open-and-close valves 581 and 582. Also, the pump 510 that delivers the intermediate heat medium from the buffer tanks 561 and 562 to the side of the heat exchanger 525 is interposed in the buffer tank common lead-out path 571.

It is noted that the open-and-close valves 586, 588, 587, 589, 583, and 584 are respectively interposed in the first side introduction paths 576 and 578, the second side introduction paths 577 and 579, the transport-side buffer tank lead-out path 572, and the building-side buffer tank lead-out path 573. Also, the temperatures of the intermediate heat media in the buffer tanks 561 and 562 are periodically acquired by the temperature sensor not illustrated, and the temperatures acquired are appropriately informed to the control means 5 via the buffer tank information acquisition means 7.

Regarding the above-mentioned constitution, the heat exchanger 525 realizes the heat exchange between a fluid introduced through the common lead-out path 607 and a fluid introduced through the common introduction path 505. It is noted that although a heat exchange fluid is introduced from the same side of the heat exchanger 525 in the diagram, the circulation direction of the heat exchange fluid is arbitrary, and either a following current or a counter current is applicable.

Also, the pump 512 includes the functions of delivering the heat medium to the supply loop 110 or the return loop 120 via the heat exchanger 525 or the bypass flow path 511 and transporting the heat media existed in the supply loop 110 or the return loop 120 to the downstream side by means of the above-mentioned delivery.

Similarly, the pump 510 includes the functions of delivering the intermediate heat medium from the buffer tanks 561 and 562 to the heat exchanger 525, pushing out the intermediate heat medium in the transport path to the downstream side by the delivery, and transporting the intermediate heat medium to the buffer tanks 561 and 562. It is noted that the heat energy is applied to or deprived of the intermediate heat medium that has passed the heat exchanger 525. Accordingly, when the intermediate heat medium after passing through the heat exchanger 525 is returned to the same buffer tank that has delivered the intermediate heat medium, the intermediate heat media having different temperatures are mixed in the buffer tank, and as a result, a heat loss occurs. Accordingly, in principle, it is preferable that the intermediate heat medium after passing through the heat exchanger 525 be returned to another buffer tank that is different from the buffer tank that has delivered the intermediate heat medium.

In the above-mentioned heat interchange system that includes a plurality of buildings inclusive of the thermal packet storage 560, the heat packet can be transported between the buildings through the same procedures as the above-mentioned heat interchange procedure, transport path determination procedure, transport method determination procedure, and infusion method determination procedure. As a result, the heat energy generated in the buildings that include the heat source can be effectively utilized in the region.

Hereinafter, the operation of the thermal packet storage 560, which is different from the operation of the above-mentioned thermal packet storage 540, will be sequentially described. It is noted that, paths through which the heat medium pass are illustrated in the thick lines, and other paths are illustrated in the thin lines in FIGS. 21 to 23 described below. Also, the open-and-close valves being in an open state are illustrated and painted in black, and the open-and-close valves being in a closed state are illustrated by a line drawing.

Figure 21:
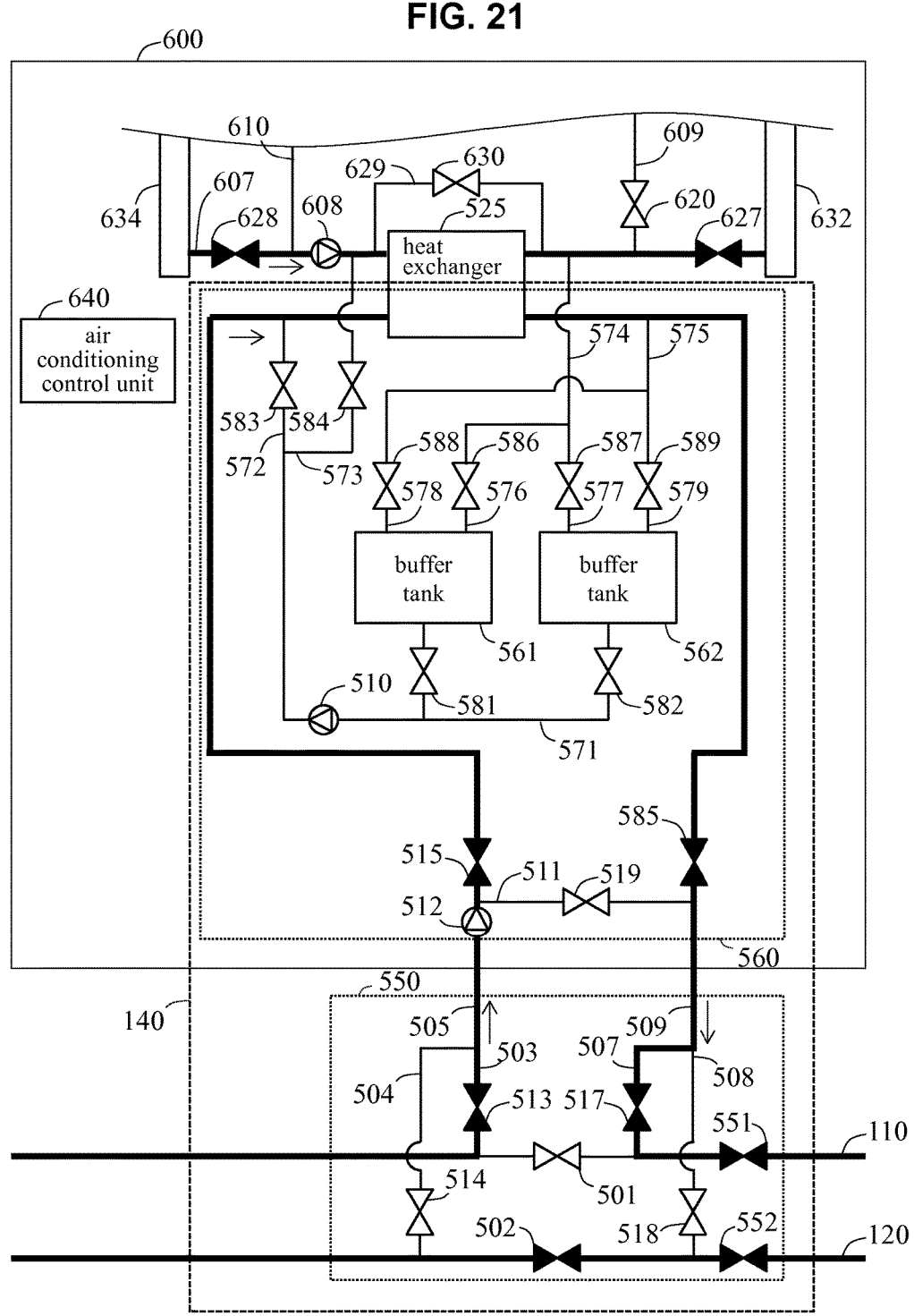
FIG. 21 is a diagram to describe the operation of the heat interchange system in an embodiment of the present invention.

First, the heat exchange between the transportation heat medium extracted from the supply loop 110 by the thermal router 550, and the air-conditioning heat medium will be described. FIG. 21 is a diagram to describe the operation of the heat exchange.

As illustrated in FIG. 21, the heat exchange between the transportation heat medium extracted from the supply loop 110 and the air-conditioning heat medium can be realized, for example, by bringing the open-and-close valve 501 into a closed state and the open-and-close valves 513, 515, 585, 517, and 551 into an open state. In this example, the open-and-close valves 628 and 627 are brought into an open state on the building side, and a flow path passing through the fourth header 634 and the second header 632 is exemplified. The heat energy may be transferred from the transportation heat medium to the air-conditioning heat medium or may be transferred from the air-conditioning heat medium to the transportation heat medium. It is noted that this example illustrates the constitution in which the heat medium extracted from the supply loop 110 is infused to the supply loop 110, and the transportation of the heat media continues in the return loop 120, but the heat medium extracted from the return loop 120 may be infused into the return loop 120. Also, the heat medium extracted from the supply loop 110 may be infused into the return loop 120. Furthermore, it is possible to infuse the heat medium extracted from the return loop 120 into the supply loop 110. This constitution can be realized by appropriately switching the flow paths of the thermal router 550.

Figure 22:
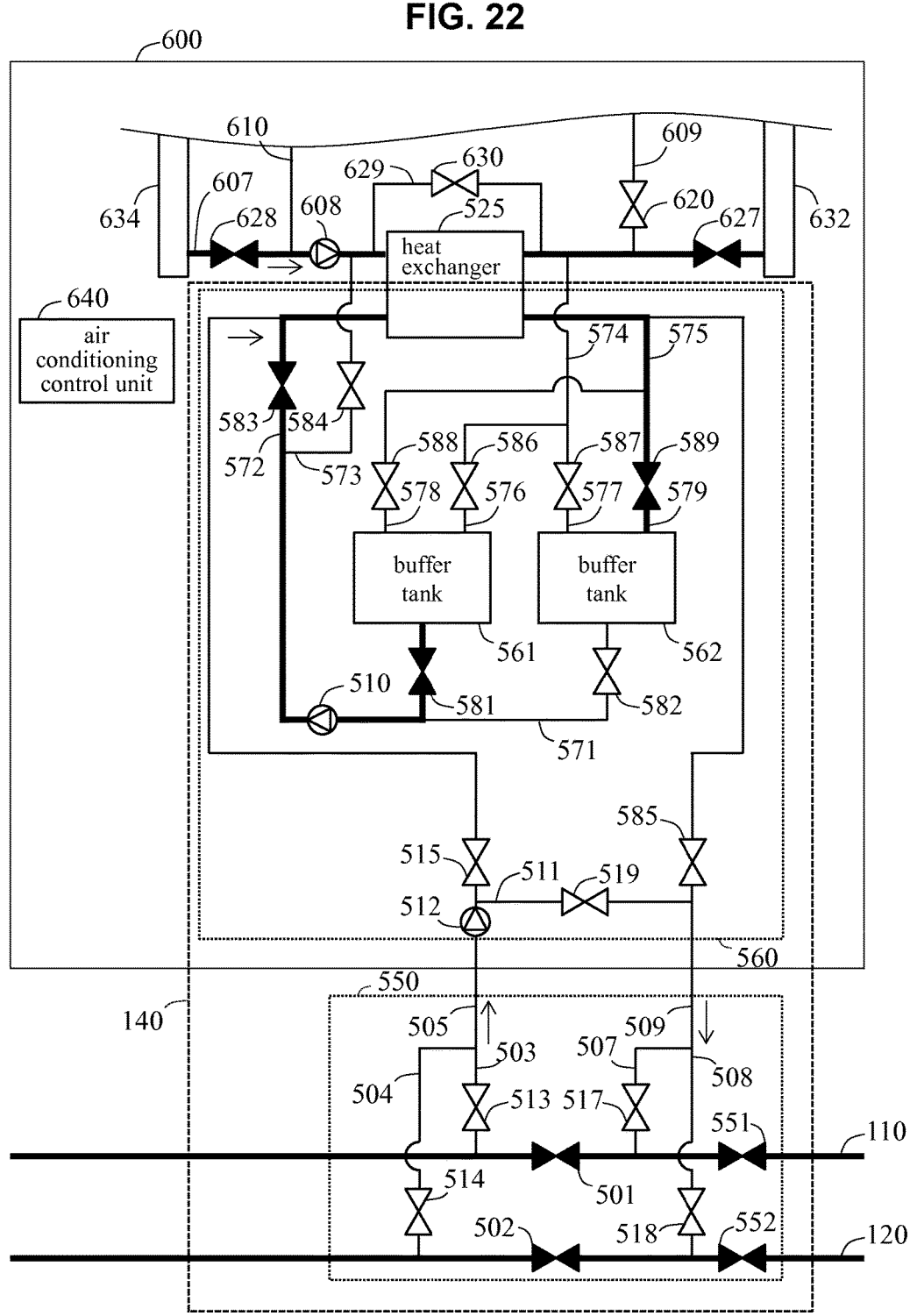
FIG. 22 is a diagram to describe the operation of the heat interchange system in an embodiment of the present invention.

FIG. 22 is a diagram to describe the operation of the heat exchange between the intermediate heat medium and the air-conditioning heat medium. As illustrated in FIG. 22, the heat exchange between the intermediate heat medium and the air-conditioning heat medium can be realized, for example, by bringing the open-and-close valves 581 583, and 589 into an open state. Accordingly, the intermediate heat medium extracted from the first buffer tank 561 can be introduced to the heat exchanger 525, and the intermediate heat medium that have passed the heat exchanger 525 can be stored in the second buffer tank 562. In this example, the open-and-close valves 628 and 627 are brought into an open state on the building side, and a flow path passing through the fourth header 634 and the second header 632 is exemplified. The heat energy may be transferred from the intermediate heat medium to the air-conditioning heat medium or may be transferred from the air-conditioning heat medium to the intermediate heat medium. It is noted that this example illustrates the constitution in which the transportation of the heat media continues in the supply loop 110 and the return loop 120.

Figure 23:
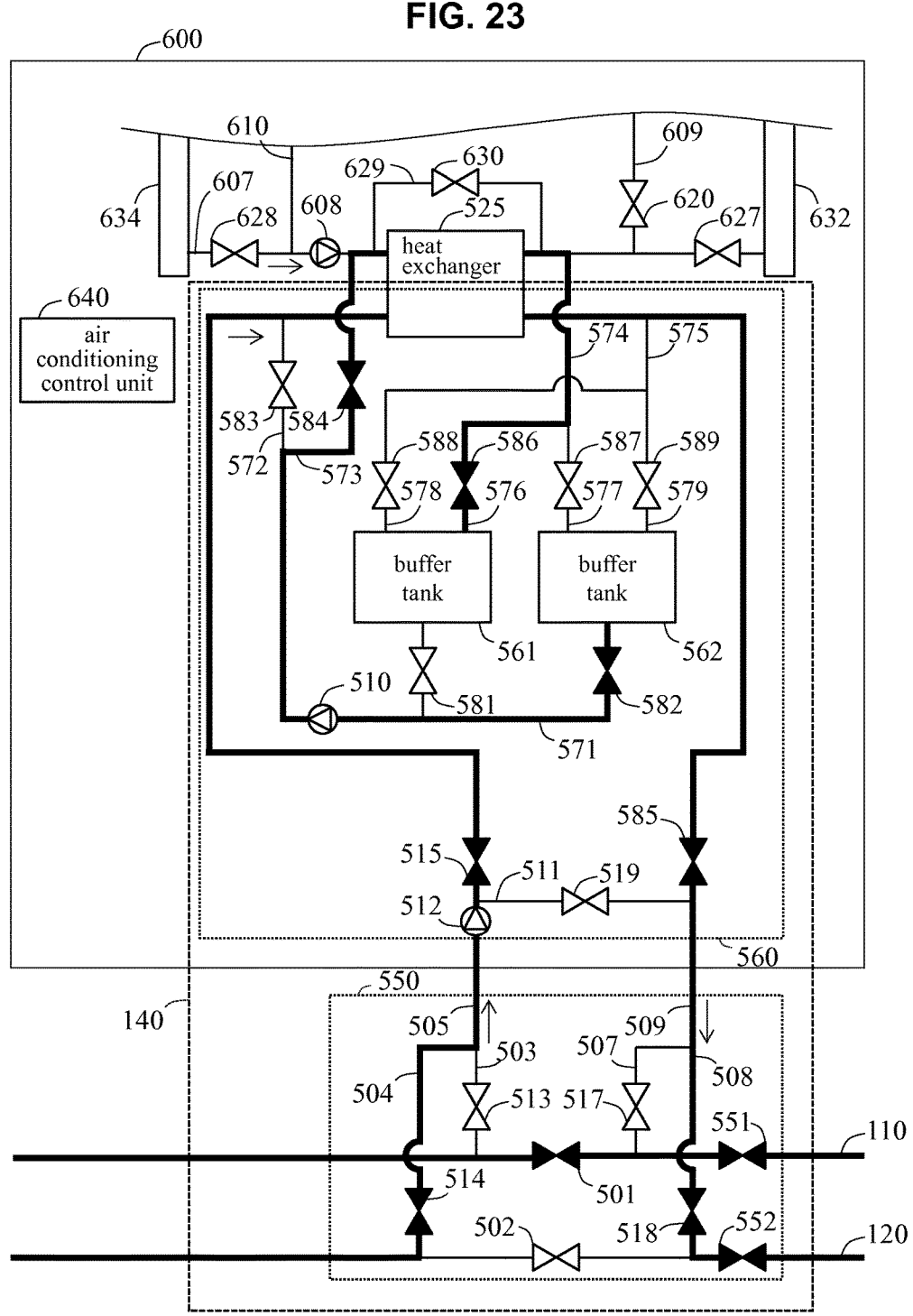
FIG. 23 is a diagram to describe the operation of the heat interchange system in an embodiment of the present invention.

FIG. 23 is a diagram to describe the operation of the heat exchange between the intermediate heat medium and the transportation heat medium extracted from the return loop 120. As illustrated in FIG. 23, the heat exchange between the intermediate heat medium and the transportation heat medium can be realized, for example, by bringing the open-and-close valve 502 into a closed state and the open-and-close valves 514, 515, 585, 518, 552, 582, 584, and 586 into an open state. Accordingly, the intermediate heat medium extracted from the second buffer tank 562 can be introduced to the heat exchanger 525, and the intermediate heat medium that have passed the heat exchanger 525 can be stored in the first buffer tank 561. Also, the heat exchange between the intermediate heat medium and the transportation heat medium can be made in the heat exchanger 525. The heat energy may be transferred from the intermediate heat medium to the transportation heat medium or may be transferred from the transportation heat medium to the intermediate heat medium. It is noted that this example illustrates the constitution in which the heat medium extracted from the return loop 120 are infused to the return loop 120, and the transportation of the heat media continues in the supply loop 110, but the heat medium extracted from the supply loop 110 may be infused into the supply loop 110. Also, the heat medium extracted from the supply loop 110 may be infused into the return loop 120. Furthermore, it is possible to infuse the heat medium extracted from the return loop 120 into the supply loop 110. This constitution can be realized by appropriately switching the flow paths of the thermal router 550.

It is noted that, in this example, when the intermediate heat medium is delivered from the second buffer tank 562 to the heat exchanger 525 by means of the pump 510, the intermediate heat medium pushed out by the above-mentioned delivery in the transport path is flown into the first buffer tank 561. Accordingly, when the second buffer tank 562 becomes empty during the operation of the pump 510, the intermediate heat medium cannot be transferred anymore.

For example, a case is assumed where the intermediate heat medium including the heat energy is stored in the second buffer tank 562, and the heat energy is transferred to other buildings. In this case, it is necessary to cause the intermediate heat medium stored in the second buffer tank 562 to reach the heat exchanger 525. However, at a time point when the intermediate heat medium in the second buffer tank 562 is all extracted, the intermediate heat medium including the heat energy stop and cannot transfer in the buffer tank common lead-out path 571 and the building-side buffer tank lead-out path 573, leading to the heat exchanger 525. In this case, the open-and-close valve 581 is placed in an open state, and the open-and-close valve 582 is placed in a closed state. This makes it possible to allow the pump 510 to continue the transport of the intermediate heat medium by use of the intermediate heat medium in the first buffer tank 561.

Figure 24:
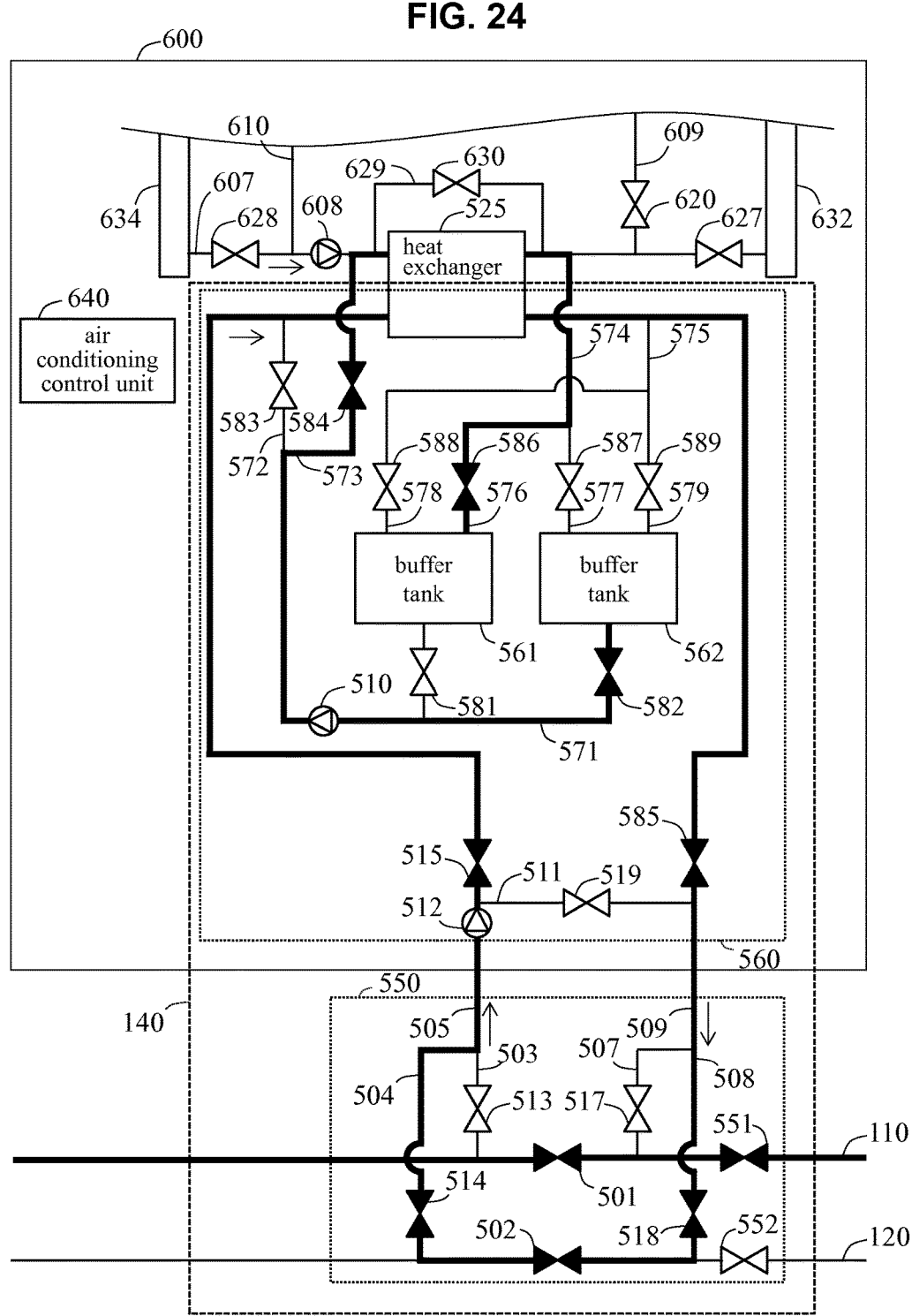
FIG. 24 is a diagram to describe the operation of the heat interchange system in an embodiment of the present invention.

Also, in this example, preferably, when the intermediate heat medium including the heat energy reach the heat exchanger 525, the transfer of the transportation heat medium is started (that is, the drive of the pump 512 is started). In this case, as illustrated in FIG. 24, it may be such that the open-and-close valve 552 is placed in a closed state, and the open-and-close valve 502 is placed in an open state in the return loop 120. Then, it may be such that when the transportation heat medium, to which the heat energy is applied in the heat exchanger 525, reaches the return loop 120, the open-and-close valve 502 is brought into a closed state, and the open-and-close valve 552 is brought into an open state (or the open-and-close valve 514 is brought into a closed state). Accordingly, the heat medium existed in the common lead-out path 509 at the time of starting the drive of the pump 512 is introduced to the common introduction path 505 through the return loop side introduction path 504, so that unnecessary heat medium, to which the heat energy is not applied, can be suppressed from being transported in the return loop 120.

It is noted that, as described above, the constitution, in which the two annular transport paths made up of the supply loop 110 and the return loop 120 are provided side by side as the heat medium transport path, has been described as a particularly favorable embodiment, but three annular transport paths or more may be provided side by side.

Figure 25:
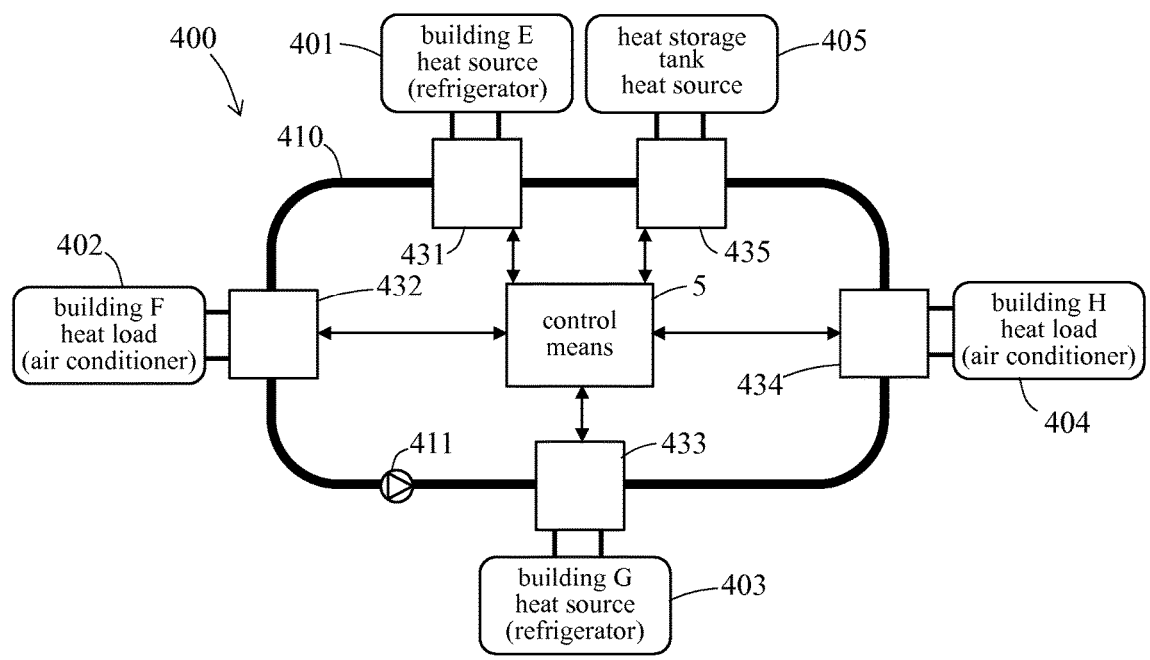
FIG. 25 is a schematic configuration diagram illustrating the entire constitution of other heat interchange system in an embodiment of the present invention.

Incidentally, in the above-mentioned case, the constitution, in which the two annular transport paths are provided side by side, is exemplified as the heat medium transport path, but the heat medium transport path can be constituted by one annular transport path. FIG. 25 is a diagram illustrating other example of the heat interchange system in an embodiment of the present invention. It is noted that, hereinafter, an embodiment is will be described based on a case where the system carries out the cooling.

As illustrated in FIG. 25, the heat interchange system 400 of the present embodiment includes an annular heat medium transport path 410. The heat medium transport path 410 transports the heat media 6 to which the heat energy is applied. Heat sources and heat demand ends are connected to the heat medium transport path 410. Herein, as one example, heat sources 401, 403, and 405 as the heat source (heat supply end) and heat loads 402 and 404 as the heat demand ends are illustrated. It is noted that the heat source 401 is made up of the heat source constituted by the refrigerator included in a building E, and the heat source 403 is made up of the heat source constituted by the refrigerator included in a building G. The heat source 405, for example, is made up of the heat source constituted by the above-mentioned multi-step form thermal storage water tank. Also, the heat load 402 is made up of the heat load constituted by the air conditioner included in a building F, and the heat load 404 is made up of the heat load constituted by the air conditioner included in a building H. It is noted that, herein, the buildings E and G are assumed as the heat sources, and the buildings F and H are assumed as the heat demand ends, but the air conditioners included in the buildings E and G can be applied as the heat loads. Also, for example, when the buildings F and H include the refrigerator for air conditioning and the like, the buildings F and H can be applied as the heat sources.

The heat sources 401, 403, and 405 and the heat loads 402 and 404 are connected to the heat medium transport path 410 via connection portions 431, 432, 433, 434, and 435. The connection portions 431 to 435 include a function of supplying the heat energy generated in the heat source of each building to the heat media in the heat medium transport path 410 and a function of acquiring the heat energy from the heat media in the heat medium transport path 410. The connection portions 431 to 435, for example, can be constituted by the above-mentioned thermal router 530 and the thermal packet storage 540, in which the connection paths (the return loop side introduction path 504 and the return loop side lead-out path 508) on the side of the return loop 120 are omitted. However, herein, the connection portions 431 to 435 are constituted by the heat exchangers. Accordingly, in this example, the heat media 6 are not taken out from the heat medium transport path 410, and only the heat energy is given and received between the heat media 6 and the heat sources 401, 403, and 405 or between the heat media 6 and the heat loads 402 and 404. Also, regarding the above-mentioned constitution, the transport (circulation) of the heat media 6 in the heat medium transport path 410 is realized by a pump 411 interposed in the heat medium transport path 410.

In the heat medium transport path 410, the heat media 6 are distributed in a state of having temperatures that are different from each other, as exemplified in FIG. 1. That is, the heat media 6 are transported as the heat packets in the heat medium transport path 410. It is noted that the above-mentioned optical fiber 15 that acquires the temperature distribution of the heat media 6 in the transport path is installed in interior of the heat medium transport path 410, and the distribution of the heat packets in the heat medium transport path 410 is acquired by the above-mentioned temperature distribution acquisition means 4 (not illustrated).

The above-mentioned control means 5 is connected to the above-mentioned temperature distribution acquisition means 4 not illustrated and the connection portions 431 to 435 (herein, the heat exchangers) in a state of being capable of transmitting and receiving data, and as described above, the control means 5 receives the load request of the heat load 402 or the heat load 404, which is the heat demand end, and when the heat packet that satisfies the load request received reaches the connection portion of the heat load that makes the load request, based on the temperature distribution (the distribution of the heat packets) acquired by the temperature distribution acquisition means 4, the control means 5 causes the heat demand end to take out the heat energy from the heat packet reached via the connection portion. It is noted that, as described above, the control means 5 acquires the temperature distribution in the heat medium transport path 410 in real time, so that the arrival timing of the heat packet can be detected. Alternatively, as described above, it may be such that the control means 5 notifies the heat demand end of the estimated arrival time of the heat packet based on the temperature distribution acquired by the temperature distribution acquisition means 4.

With this constitution, the temperature distribution illustrated in FIG. 1, for example, is generated such that, in a state where the heat media 6 of 5 degrees C. circulate in the entire heat medium transport path 410, the heat medium 6 in the heat medium transport path 410 reaches the temperature of 10 degrees C. (the heat packet 12*b*) as a consequence of the heat exchange of the heat load 402 with the heat medium of a predetermined amount, and the heat media 6 in the heat medium transport path 410 reaches the temperature of 12 degrees C. (the heat packet 12*d*), as a consequence of the heat exchange of the heat load 404 with the heat medium of a predetermined amount, and the like.

For example, regarding the constitution exemplified in FIG. 25, the heat media 6 in the heat medium transport path 410 are represented as the temperature distribution illustrated in FIG. 1, the heat load 402 makes the load request, and when the request can be satisfied by the heat medium 6 of 10 degrees C., the control means 5 causes the connection portion 432 to take out the heat energy from the heat packet 12*b* when the heat packet 12*b* of 10 degrees C. reaches the connection portion (the heat exchanger) 432 of the heat load 402. Also, when the heat load 402 makes the load request, and the request cannot be satisfied by any of the heat packets in the heat medium transport path 410, the control means 5, for example, supplies the heat energy to the heat packet 12*b* when the heat packet 12*b* of 10 degrees C. reaches the connection portion (the heat exchanger) 431 of the heat source 401, and the control means 5 changes the temperature of the heat medium 6 to 5 degrees C. Then, when the heat packet of 5 degrees C., whose length is extended (the length of the heat packets 12*a* to 12*c* in FIG. 1) reaches the connection portion 432 of the heat load 402, the control means 5 causes the connection portion 432 to take out the heat energy from the heat packet. It is noted that, as described above, the generation of the heat packet is carried out by the heat source determined based on the conditions designated in advance by the control means 5. In this example, the heat source that belongs to the heat interchange system 400 is connected to the control means 5 in such a manner as to be capable of communicating with each other, and it is configured that the operational state of each heat source is appropriately informed to the control means 5.

Also, when the use of both the first heat packet 12*a* of 5 degrees C. and the second heat packet 12*c* of 5 degrees C. illustrated in FIG. 1 can satisfy the load request of the heat load 402, the control means 5 causes the connection portion 432 to take out the heat energy from the heat medium respectively when the first heat packet 12*a* of 5 degrees C. reaches the connection portion 432 of the heat load 402, and when the second heat packet 12*c* of 5 degrees C. reaches the connection portion 432 of the heat load 402.

Regarding the above-mentioned heat interchange system 400, the flow rate is fixed in the heat medium transport path 410, and unless the connection portions 431 to 435 have the identical performance as the heat exchanger, the heat interchange system 400 is subject to the constraints such as impossibility of the transport of the heat packets (the mixture of the heat media), but can obtain the same effect as that of the above-mentioned heat interchange system 100.

It is noted that the above-mentioned embodiment is not limited to the technical scope of the present invention, but various modifications and applications can be provided within the scope of the present invention, besides ones that have already been described. For example, in the above-mentioned embodiment, the specific example of air cooling has been described, but the same effect can be obtained with regard to heating. Also, in the above-mentioned embodiment, the case has been mainly described where the heat medium transport path is annular, but the present invention can be applied to the heat medium transport path that is not annular. Even when not annular, the heat energy can be transported in a state where the heat media to which the different heat energy is applied coexist in the heat medium transport path, so that it is possible to obtain the effects that the heat energy that becomes redundant in the building connected to the heat energy transport system or the heat energy that remains after being used in the building can be arbitrarily transported to other buildings.

Also, the flowchart diagrams illustrated in FIGS. 8 to 11 are exemplification, and the operations of the present invention are not limited to the operations of these flowchart diagrams. Various modifications and applications can be applied such that the heat packets are divided and infused.

INDUSTRIAL APPLICABILITY

The present invention is useful for a heat energy transport system, a heat interchange system, and a heat energy transport method, which can exceedingly effectively utilize the hear energy generated in a region and are easily applied to the existing buildings.

REFERENCE SIGNS LIST

1, 410 Heat medium transport path
2, 101, 103, 105, 401, 403, 405, 604 Heat source
3, 102, 104, 402, 404 Heat demand end (Heat load)
4 Temperature distribution acquisition means
5 Control means
6 Heat media
10 Heat energy transport system
12a to 12d Mass of heat media (Heat packet)
15 Optical fiber
100, 400 Heat interchange system
110 First transport path (Supply loop)
120 Second transport path (Return loop)
130 to 135, 140 Connection portion
431 to 435 Connection portion (Heat exchanger)
501, 502 Open-and-close valve
503 Supply loop side introduction path (First heat introduction path)
504 Return loop side introduction path (Second heat introduction path)
505 Common introduction path
506 Buffer tank
507 Supply loop side lead-out path (First heat lead-out path)
508 Return loop side lead-out path (Second heat lead-out path)
509 Common lead-out path
510, 512 Pump
513 to 515 Open-and-close valve
517 to 519 Open-and-close valve
520, 521, 522, 523, 525 Heat exchanger
530, 550 Thermal router
540, 560 Thermal packet storage
561, 562 Buffer tank
581 to 589 Open-and-close valve
601 to 603 Air conditioning area (Air conditioner)

The invention claimed is:

1. A heat energy transport system comprising:
a heat medium transport path in which heat media that transport heat energy are transported;
the heat media that are distributed in the heat medium transport path in a state of having temperatures that are different from each other, and that are sequentially transported in the heat medium transport path, wherein a series of the heat media having the same temperature has a predetermined length along a heat transport direction in the heat medium transport path;
a heat source configured to be connected to the heat medium transport path and supply the heat energy to the heat medium transport path;
a heat demand end configured to be connected to the heat medium transport path and take out the heat energy from the heat medium transport path, wherein the heat demand end is configured to make a load request;
a temperature distribution acquisition means configured to acquire temperature distribution of the heat media; and
a control means configured to receive the load request of the heat demand end and, when a heat medium having the heat energy that, based on the temperature distribution acquired by the temperature distribution acquisition means, satisfies the load request reaches the heat demand end that makes the load request, configured to cause the heat demand end to take out the heat energy from a heat medium.

2. The heat energy transport system according to claim 1, wherein the control means is configured to cause the heat source to supply the heat medium having the heat energy that satisfies the load request.

3. The heat energy transport system according to claim 2, wherein a plurality of heat sources are connected to the heat medium transport path, and the control means is configured to specify the heat source, by which the heat energy is supplied, based on an operational state of each heat source.

4. The heat energy transport system according to claim 1, wherein the heat medium transport path is annularly formed, and the heat medium is not taken out from the heat medium transport path with regard to the heat source and the heat demand end, and only the heat energy is given to and received from the heat media.

5. The heat energy transport system according to claim 1, wherein the heat medium transport path includes an annular first transport path and an annular second transport path, and
wherein the heat source and the heat demand end include a buffer tank that accumulates the heat medium taken out from the first transport path or the second transport path, and the heat energy is given to and received from the heat medium accumulated in each of the buffer tanks.

6. The heat energy transport system according to claim 1, wherein the heat medium transport path includes an annular first transport path and an annular second transport path, and
wherein the heat source and the heat demand end include a buffer tank that accumulates intermediate heat medium through which the heat energy is given to and received from the heat media transported through the heat medium transport path, and
wherein the heat energy is given and received between the heat medium used in the heat source and the heat demand end and the intermediate heat medium accumulated in each of the buffer tanks.

7. The heat energy transport system according to claim 1, further comprising:
- a first building configured to include at least one air conditioner, wherein the heat demand end is the first building;
- a second building, wherein the heat source is included in the second building;
- the control means configured to receive the load request of the air conditioner of the first building, and when the heat medium having the heat energy that satisfies the load request received reaches the first building, configured to cause the air conditioner to use the heat energy taken out.

8. The heat energy transport system according to claim 7, wherein the control means is configured to cause the heat source included in the second building to supply the heat medium having the heat energy that satisfies the load request.

9. The heat energy transport system according to claim 8, wherein a plurality of buildings, each of which includes the heat source, are connected to the heat medium transport path, and the control means is configured to specify the second building, from among the plurality of buildings, based on an operational state of the heat source of each building.

10. The heat energy transport system according to claim 7, wherein the heat medium transport path includes an annular first transport path and an annular second transport path, and
wherein the first building and the second building include a buffer tank that accumulates the heat medium taken out from the first transport path or the second transport path, and the heat energy is given to and received from the heat medium accumulated in each of the buffer tanks.

11. The heat energy transport system according to claim 10, wherein the heat medium transport path is connected to a plurality of buildings, each of which includes the buffer tank that accumulates the heat medium taken out from the first transport path or the second transport path, and
wherein when a heat medium having the heat energy that satisfies the load request received is accumulated in the buffer tank included in any of the plurality of buildings, and use of the heat medium in the buffer tank is not decided, the control means is configured to specify the building and the buffer tank as the second building and the heat source.

12. The heat energy transport system according to claim 10, wherein the buffer tank functions as a soaking tank that generates a heat medium having a single temperature, by use of the heat media having different temperatures or remaining heat energy discharged from the buildings.

13. The heat energy transport system according claim 10, wherein when the heat source of the second building infuses the heat medium, to which the heat energy is applied, into the first transport path or the second transport path, the heat medium of a same amount as an amount of heat medium infused from the transport path, which is a target for the infusion, is extracted concurrently with the infusion, on a downstream side of a position of the infusion.

14. The heat energy transport system according to claim 10, wherein the heat medium, to which the heat energy is applied, is extracted in the buffer tank of the first building from the first transport path or the second transport path, the heat medium of a same amount as an amount of heat medium extracted is infused, concurrently with the extraction, into the transport path that is a target for the infusion, on an upstream side of a position of the extraction.

15. The heat energy transport system according to claim 10, wherein when heat medium having a temperature out of a range designated in advance is infused into the first transport path or the second transport path, the heat medium is infused into one transport path designated in advance, out of the first transport path and the second transport path.

16. The heat energy transport system according to claim 10, wherein a connection portion between the first transport path and the second transport path, and the buffer tank includes:
- an open-and-close valve configured to be interposed in the first transport path;
- an open-and-close valve configured to be interposed in the second transport path;
- a first heat medium introduction path whose one end is configured to be connected to one side of the open-and-close valve of the first transport path;
- a second heat medium introduction path whose one end is configured to be connected to one side of the open-and-close valve of the second transport path;
- a common introduction path whose one end is configured to be connected to the other ends of the first heat medium introduction path and the second heat medium introduction path, and whose other end is configured to be connected to the buffer tank;
- a first heat medium lead-out path whose one end is configured to be connected to the other side of the open-and-close valve of the first transport path;
- a second heat medium lead-out path whose one end is configured to be connected to the other side of the open-and-close valve of the second transport path;
- a common lead-out path whose one end is configured to be connected to the other ends of the first heat medium lead-out path and the second heat medium lead-out path, and whose other end is configured to be connected to the buffer tank;
- an open-and-close valve configured to be interposed in the first heat medium introduction path;
- an open-and-close valve configured to be interposed in the second heat medium introduction path;
- an open-and-close valve configured to be interposed in the common introduction path;
- an open-and-close valve configured to be interposed in the first heat medium lead-out path;
- an open-and-close valve configured to be interposed in the second heat medium lead-out path;
- a pump configured to be provided on an upstream side of the open-and-close valve interposed in the common introduction path and configured to deliver the heat medium to the buffer tank side;
- a pump configured to be provided in the common lead-out path and configured to deliver the heat medium from the buffer tank to the one end side of the common lead-out path;
- a bypass flow path configured to connect between the common introduction path disposed between the pump and the open-and-close valve of the common introduction path, and the common lead-out path on the downstream side of the pump of the common lead-out path; and an open-and-close valve configured to be interposed in the bypass flow path.

17. The heat energy transport system according to claim 7, wherein the heat medium transport path includes an annular first transport path and an annular second transport path, and wherein the first building and the second building include a buffer tank that accumulates intermediate heat medium through which the heat energy is given to and received from the heat media transported through the heat medium transport path, and wherein the heat energy is given and received between the heat medium used in the first building and the second building and the intermediate heat medium accumulated in each of the buffer tanks.

18. The heat energy transport system according to claim 17, wherein the heat medium transport path is connected to a plurality of buildings, each of which includes the buffer tank that accumulates the intermediate heat medium through which the heat energy is given to and received from the heat media transported through the heat medium transport path, and wherein when an intermediate heat medium having the heat energy that satisfies the load request is accumulated in the buffer tank included in any of the plurality of buildings, and when a use of the intermediate heat medium in the buffer tank has not yet been decided, the control means is configured to specify the building as the second building and the buffer tank as the heat source.

19. The heat energy transport system according to claim 17, wherein a plurality of buffer tanks are arranged in each building.

20. The heat energy transport system according to claim 17, wherein the first building includes a common heat exchanger that carries out heat exchange between the heat media transported through the heat medium transport path and the intermediate heat medium, heat exchange between the heat media transported through the heat medium transport path and heat medium for the air conditioner, and heat exchange between the intermediate heat medium and the heat medium for the air conditioner.

21. The heat energy transport system according to claim 17, wherein the second building includes a common heat exchanger that carries out heat exchange between the heat media transported through the heat medium transport path and the intermediate heat medium, heat exchange between the heat media transported through the heat medium transport path and heat medium for the heat source, and heat exchange between the intermediate heat medium and the heat medium for the heat source.

22. The heat energy transport system according to claim 7, wherein the air conditioner includes a first heat medium supply path through which the heat medium, to which the heat energy generated by the heat source included in the first building is applied, is supplied, and a second heat medium supply path through which the heat medium, to which the heat energy taken out from the heat media transported through the heat medium transport path is applied, is supplied, and wherein the control means is configured to determine whether to supply the heat medium to the air conditioner through any of the first heat medium supply path and the second heat medium supply path, based on the load request and a condition designated in advance.

23. A heat energy transport method, preparing the heat energy transport system of claim 1, comprising the steps of:

receiving a load request;

acquiring temperature distribution of heat media that have temperatures being different from each other in a heat medium transport path, in which the heat media that transport heat energy are transported, and that are sequentially transported in a state of having a predetermined length in a transport direction in the heat medium transport path;

specifying a mass of heat medium having the heat energy that satisfies the load request received, based on the temperature distribution;

transporting the mass of heat medium specified to a request source of the load request through the heat medium transport path; and taking out the heat energy from the heat medium reached when the mass of heat medium specified reaches the request source of the load request.

24. The heat energy transport method according to claim 23, wherein the step of specifying the mass of heat medium having the heat energy that satisfies the load request received, based on the temperature distribution, further comprises a step, when the mass of heat medium having the heat energy that satisfies the load request received cannot be specified, of generating the mass of heat medium having the heat energy that satisfies the load request in the heat medium transport path by mean of a heat source connected to the heat medium transport path.

25. The heat energy transport method according to claim 23, wherein the step of specifying the mass of heat medium having the heat energy that satisfies the load request received, based on the temperature distribution, further comprises a step, when the mass of heat medium having the heat energy that satisfies the load request received cannot be specified, of generating the mass of heat medium having the heat energy that satisfies the load request in the heat medium transport path by means of remaining heat energy whose part is consumed in other building connected to the heat medium transport path.

* * * * *